(12) United States Patent
Okabe

(10) Patent No.: US 8,163,250 B2
(45) Date of Patent: Apr. 24, 2012

(54) HOLDING SEALING MATERIAL, METHOD FOR ROLLING HOLDING SEALING MATERIAL, AND EXHAUST GAS PURIFYING APPARATUS

(75) Inventor: Takahiko Okabe, Takahama (JP)

(73) Assignee: Ibiden Co., Ltd., Ogaki-shi (JP)

( * ) Notice: Subject to any disclaimer, the term of this patent is extended or adjusted under 35 U.S.C. 154(b) by 0 days.

(21) Appl. No.: 12/979,728

(22) Filed: Dec. 28, 2010

(65) Prior Publication Data

US 2011/0280771 A1    Nov. 17, 2011

(30) Foreign Application Priority Data

May 17, 2010   (EP) ..................................... 10162938

(51) Int. Cl.
*B01D 50/00* (2006.01)
(52) U.S. Cl. ....................................................... 422/179
(58) Field of Classification Search .................. 422/168, 422/177, 179, 180; 55/523; 428/116
See application file for complete search history.

(56) References Cited

U.S. PATENT DOCUMENTS

| | | | |
|---|---|---|---|
| 2003/0091480 A1 | 5/2003 | Yamaguchi et al. | |
| 2003/0175177 A1 | 9/2003 | Tosa et al. | |
| 2009/0022633 A1* | 1/2009 | Tomosue et al. | 422/177 |

FOREIGN PATENT DOCUMENTS

| | | |
|---|---|---|
| DE | 198 19 083 | 11/1999 |
| DE | 10 2006 037361 | 2/2008 |
| DE | 10 2007 034832 | 1/2009 |
| EP | 1752266 | 2/2007 |
| JP | 8-103662 | 4/1996 |
| JP | 2007-218221 | 8/2007 |
| JP | 2009-264186 | 11/2009 |

OTHER PUBLICATIONS

Extended European search report for EP Application No. 10162938.4, Nov. 8, 2010.

* cited by examiner

*Primary Examiner* — Tom Duong
(74) *Attorney, Agent, or Firm* — Ditthavong Mori & Steiner, P.C.

(57) ABSTRACT

A holding sealing material includes a mat including an inorganic fibrous material. In a plan view, the mat has a basic quadrangular shape consisting of long sides extending in a longitudinal direction and short sides substantially perpendicular to the long sides. The mat has a recessed portion at one of the short sides and a projected portion at another of the short sides, whereby the projected and recessed portions should fit to each other when the mat is rolled around a periphery of a member to be wrapped. In a cross-sectional view, the projected portion is a quadrangle and the recessed portion is a gap between two quadrangles. At least one corner portion of the projected portion is cut out on a side of the member to be wrapped or another corner portion of the quadrangle of the projected or recessed portions is cut out.

23 Claims, 11 Drawing Sheets

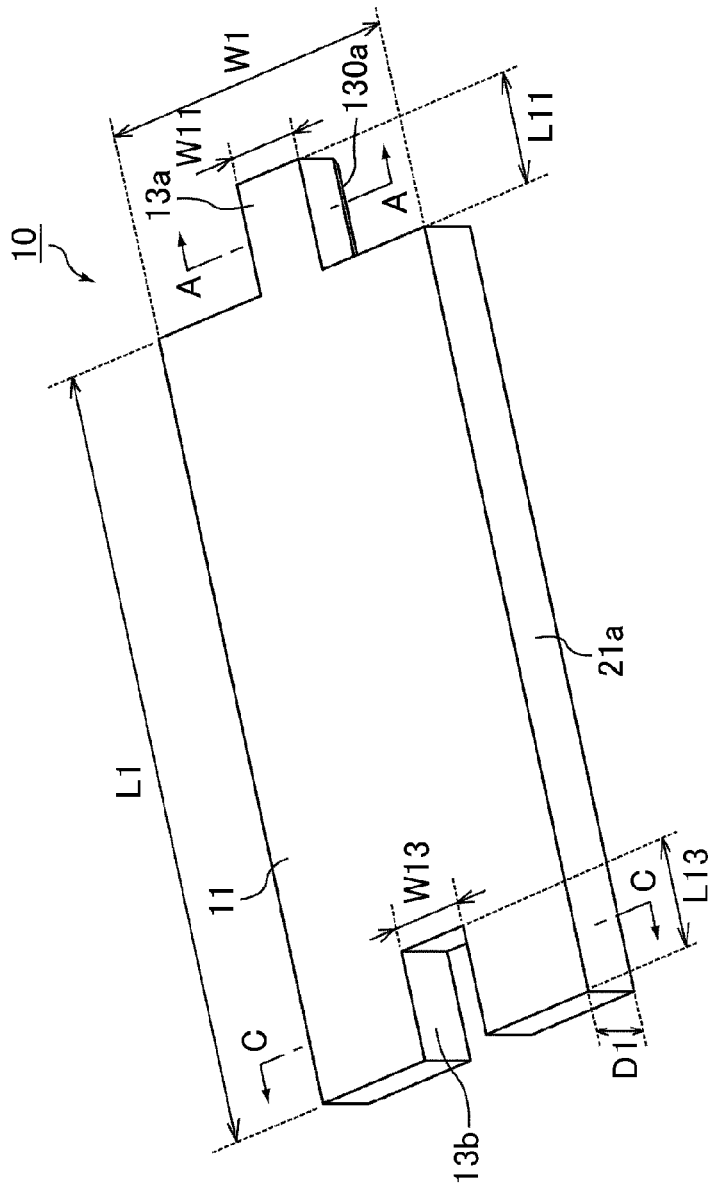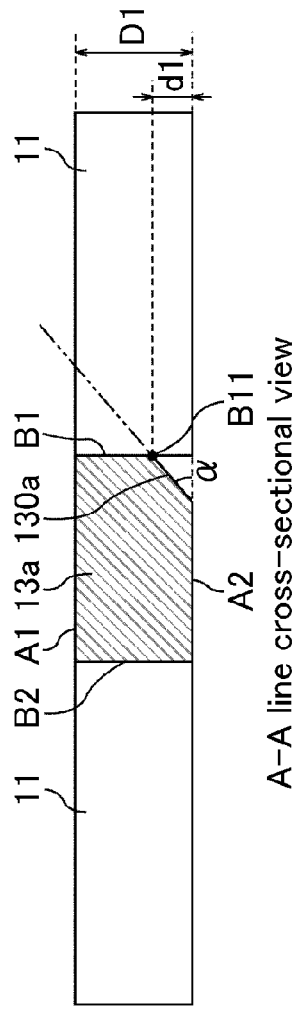
FIG.1A
FIG.1B

B-B line cross-sectional view

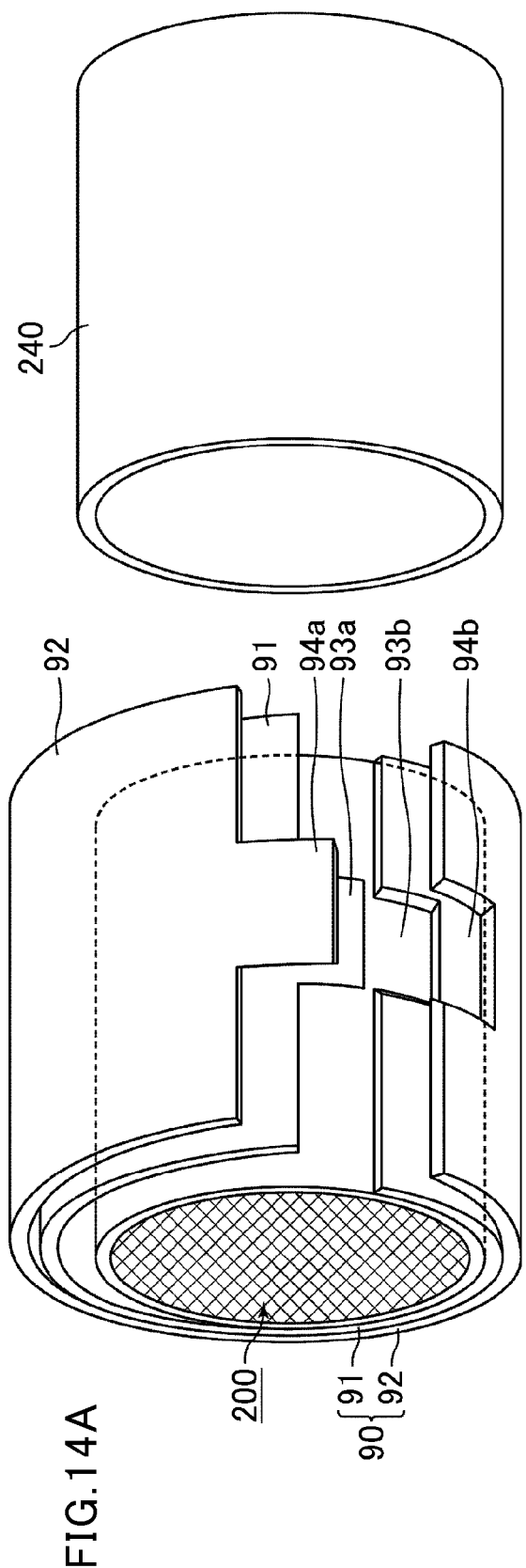
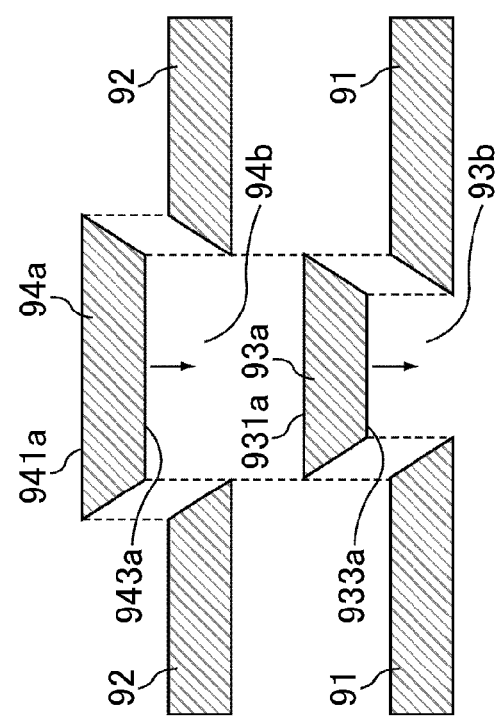
FIG.14A
FIG.14B

HOLDING SEALING MATERIAL, METHOD FOR ROLLING HOLDING SEALING MATERIAL, AND EXHAUST GAS PURIFYING APPARATUS

CROSS-REFERENCE TO RELATED APPLICATIONS

The present application claims priority under 35 U.S.C. §119 to European Patent Application No. 10162938.4 filed on May 17, 2010, the contents of which are incorporated herein by reference in their entirety.

BACKGROUND OF THE INVENTION

1. Field of the Invention

The present invention relates to a holding sealing material, a method for rolling the holding sealing material, and an exhaust gas purifying apparatus.

2. Discussion of the Background

Exhaust gas discharged from internal engines, such as diesel engines, contains particulate matter (hereinafter, also referred to as PM). The PM is becoming an issue these days because the PM is harmful to the environment and human bodies. The exhaust gas also contains harmful gases such as CO, HC, and NOx. Thus, these harmful gases are also becoming an issue due to their influence on the environment and the human bodies.

In such a situation, various exhaust gas purifying apparatuses are proposed which capture PM in exhaust gas and purify harmful gases. Examples thereof include an exhaust gas purifying apparatus including an exhaust gas treating unit including porous ceramic, such as silicon carbide or cordierite; a casing accommodating the exhaust gas treating unit; and a holding sealing material including an inorganic fibrous aggregate disposed between the exhaust gas treating unit and the casing. The holding sealing material of this type is disposed mainly for the following purposes: preventing damages on the exhaust gas treating unit which are caused by contact with the casing, which covers the periphery of the unit, due to vibration or impact generated upon driving of vehicles or other factors; and preventing leakage of exhaust gas from gaps between the exhaust gas treating unit and the casing.

The holding sealing material includes a mat including an inorganic fibrous material. In the plan view, the mat has a basic quadrangular shape consisting of long sides extending in the longitudinal direction and short sides substantially perpendicular to the long sides. A recessed portion is formed on one of the short sides, and a projected portion is formed on the other of the short side. The projected portion has a shape similar to the removed shape at the recessed portion. The mat is rolled around the periphery of the exhaust gas treating unit and the projected portion is made to fit to the recessed portion. Thereby, exhaust gas is prevented from leaking from the holding sealing material.

There has recently been an increasing demand for holding sealing materials which are excellent in heat-retention properties, that is, capable of sufficiently keeping an exhaust gas treating unit warm, so as to allow the exhaust gas treating unit to effectively exert the exhaust gas treating performance. In order to achieve such heat-retention properties, the exhaust gas treating unit and the casing are required to be widely separated from each other and a thick holding sealing material is required to fill the wide gap between the exhaust gas treating unit and the casing so as to sufficiently insulate heat. In addition, there has also been an increasing demand for higher repulsive force of the inorganic fibrous material, which is a factor for more securely holding the exhaust gas treating unit by the holding sealing material. In order to achieve such higher repulsive force of the inorganic fibrous material, the holding sealing material is required to have a higher weight (basic weight) per unit area.

The weight (basic weight) per unit area or the thickness of the holding sealing material may be increased by increasing the thickness of one mat. Alternatively, a multilayer mat is employed in which multiple mats each having the same basic weight and thickness as those of a conventional mat are combined and thereby the basic weight is increased.

In the case that the holding sealing material including multiple mats is rolled around the periphery of the exhaust gas treating unit, each mat is required to have an appropriate tension and the projected and recessed portions of each mat are required to smoothly fit to each other.

JP-A 2007-218221 and JP-A 2009-264186 each disclose the case in which multiple mats are used and fitting of projected and recessed portions of each mat is examined.

Claim 1 of JP-A 2007-218221 discloses that a laminate of mats is rolled around the periphery of a monolith without looseness in each mat and each mat is designed such that the length is adjusted so as to allow the fitting portions to fit to each other. Claim 3 of JP-A 2007-218221 discloses that the mats are fixed to each other such that at least one end of each mat freely moves in order to achieve the above feature.

JP-A 2009-264186 discloses a holding sealing material wherein the length of one mat in the longitudinal direction is longer than a mat at a lower position in the laminate, each of the mats are fixed by at least two fixing portions, and, in the side view, the at least two fixing portions are disposed at different positions in the longitudinal direction.

The contents of JP-A 2007-218221 and JP-A2009-264186 are incorporated herein by reference in their entirety.

SUMMARY OF THE INVENTION

According to one aspect of the present invention, a holding sealing material includes a mat. The mat includes an inorganic fibrous material. In a plan view, the mat has a basic quadrangular shape consisting of long sides extending in a longitudinal direction and short sides substantially perpendicular to the long sides. The mat has a recessed portion at one of the short sides and has a projected portion at another of the short sides, whereby the projected and recessed portions should fit to each other when the mat is rolled around a periphery of a member to be wrapped. The holding sealing material satisfies any one of following features (A) to (D). (A) In a cross-sectional view perpendicular to the longitudinal direction, the projected portion has a shape of a quadrangle and the quadrangle is cut at least one corner portion on a side of the member to be wrapped. (B) In the cross-sectional view, the recessed portion is a gap between two quadrangles and at least one of the quadrangles is cut at a corner portion closer to the gap on a side opposite to the member to be wrapped. (C) In the cross-sectional view, the projected portion has a shape of a quadrangle and the quadrangle is cut at at least one corner portion on a side opposite to the member to be wrapped. (D) In the cross-sectional view, the recessed portion is a gap between two quadrangles and at least one of the quadrangles is cut at a corner portion closer to the gap on a side of the member to be wrapped.

According to another aspect of the present invention, a method for rolling the above holding sealing material around the periphery of a member to be wrapped includes bringing the side having the recessed portion close to the periphery of the member. The holding sealing material is rolled around the periphery of the member to be wrapped. The projected portion is fitted to the recessed portion.

According to further aspect of the present invention, an exhaust gas purifying apparatus includes a pillar-shaped exhaust gas treating unit, a casing, and the above holding sealing material. The exhaust gas treating unit includes cells disposed in parallel in a longitudinal direction of the unit with cell walls interposed therebetween. The casing accommodates the exhaust gas treating unit. The holding sealing material is disposed between the exhaust gas treating unit and the casing, and holds the exhaust gas treating unit. The exhaust gas treating unit serves as a member to be wrapped by the holding sealing material including the mat.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 1A is a perspective view schematically showing a holding sealing material of a first embodiment of the present invention; and FIG. 1B is an A-A line cross-sectional view of the holding sealing material shown in FIG. 1A.

FIG. 14A is a perspective view schematically showing the state when the holding sealing material of the ninth embodiment of the present invention is rolled around the periphery of an exhaust gas treating unit and immediately before projected and recessed portions fit to each other; and FIG. 14B is a cross-sectional view perpendicular to the longitudinal direction schematically showing the holding sealing material of the ninth embodiment of the present invention when the holding sealing material is rolled around the periphery of the exhaust gas treating unit and immediately before the projected and recessed portions fit to each other.

DESCRIPTION OF THE EMBODIMENTS

Figure 2A:
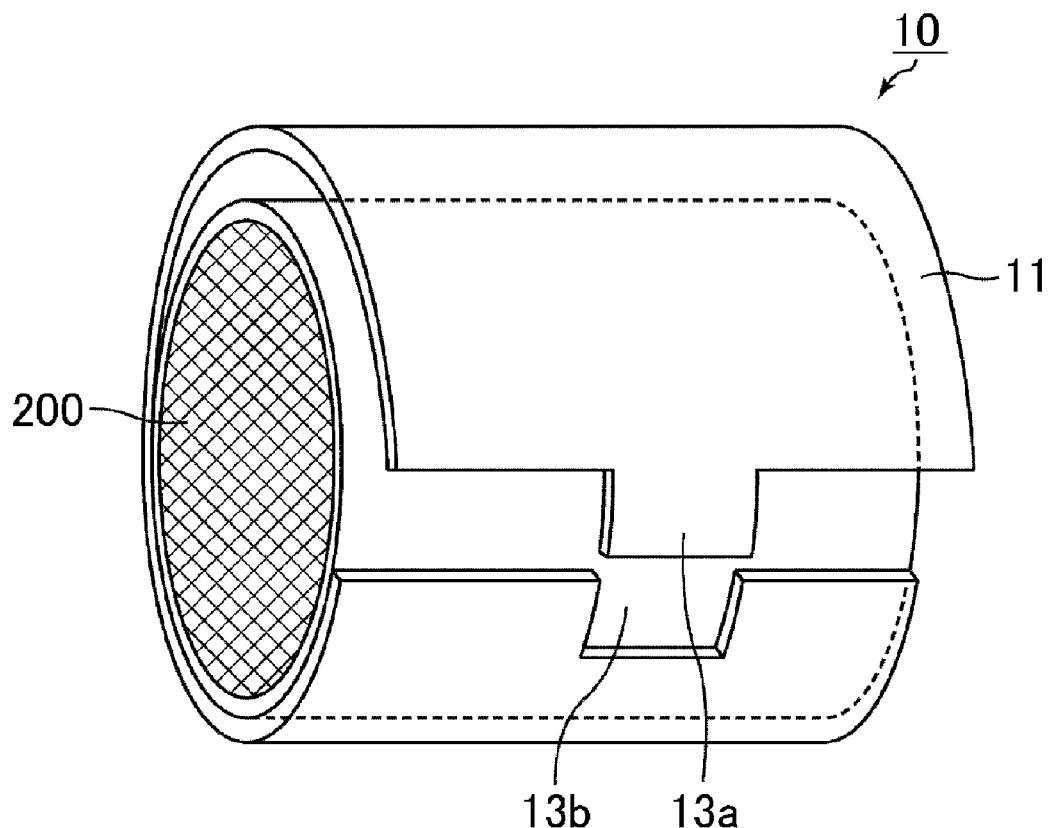
FIG. 2A is a perspective view schematically showing the holding sealing material of the first embodiment of the present invention when rolled around the periphery of a member to be wrapped and immediately before projected and recessed portions fit to each other.

The embodiments will now be described with reference to the accompanying drawings, wherein like reference numerals designate corresponding or identical elements throughout the various drawings.

A holding sealing material according to an embodiment of the present invention tends to achieve good fitting of the projected and recessed portions and thus to prevent overlapping of the fitting portions of the mat even though slight displacement occurs due to deformation of the mat when a single mat is rolled around the periphery of a member to be wrapped or slight displacement between the mats occurs in the width direction when multiple mats are rolled around the periphery of a member to be wrapped.

The holding sealing material according to the embodiment of the present invention is designed as follows: the holding sealing material includes a mat including an inorganic fibrous material; in a plan view, the mat has a basic quadrangular shape consisting of long sides extending in a longitudinal direction and short sides substantially perpendicular to the long sides; the mat has a recessed portion at one of the short sides and has a projected portion at the other of the short sides, whereby the projected and recessed portions should fit to each other when the mat is rolled around the periphery of a member to be wrapped; and the holding sealing material satisfies any one of the following features (A) to (D): (A) in a cross-sectional view perpendicular to the longitudinal direction, the projected portion has a shape of a quadrangle and the quadrangle is cut at least one corner portion on the side of the member to be wrapped; (B) in the cross-sectional view, the recessed portion is a gap between two quadrangles and at least one of the quadrangles is cut at a corner portion closer to the gap on the side opposite to the member to be wrapped; (C) in the cross-sectional view, the projected portion has a shape of a quadrangle and the quadrangle is cut at least one corner portion on the side opposite to the member to be wrapped; and (D) in the cross-sectional view, the recessed portion is a gap between two quadrangles and at least one of the quadrangles is cut at a corner portion closer to the gap on the side of the member to be wrapped.

The following will give four technical features (A), (B), (C), and (D) as to the shape of the holding sealing material according to the embodiment of the present invention. These technical features are separately described hereinbelow.

In the case that the holding sealing material according to the embodiment of the present invention satisfies the feature (A), the projected portion has a shape of a quadrangle in the cross-sectional view perpendicular to the longitudinal direction. The quadrangle is cut at least one corner portion on the side of the member to be wrapped. In other words, at least a corner portion formed by the principal face and the side face of the mat for the projected portion is cut on the side of the member to be wrapped. In this case, the corner portion is made smoother than a conventional right-angle corner. Thus, the projected and recessed portions tend to smoothly fit to each other and overlapping of the fitting portions of the mat tends to be prevented even though slight displacement occurs due to deformation of the mat when a single mat is rolled around the periphery of a member to be wrapped or slight displacement occurs between the mats in the width direction when multiple mats are rolled around the periphery of a member to be wrapped. As a result, the holding sealing material tends to prevent leakage of exhaust gas in the case that it is used for the exhaust gas treating unit such as a catalyst supporting carrier and an exhaust gas filter. Even in the case that the term "longitudinal direction" is used with regard to the projected portion, the term "longitudinal direction" used herein always means the longitudinal direction of the mat regardless of the shape of the projected portion.

In this case, it may become easier to achieve the aforementioned effects by rolling the holding sealing material around the periphery of the member to be wrapped such that the side having the recessed portion is brought close to the member to be wrapped and then the projected portion is allowed to fit to the recessed portion.

In the case that the holding sealing material according to the embodiment of the present invention satisfies the feature (B), the recessed portion is a gap between two quadrangles in the cross-sectional view perpendicular to the longitudinal direction. At least one of the quadrangles is cut at a corner portion closer to the gap on the side opposite to the member to be wrapped. In other words, a corner portion of either quadrangle adjacent to the recessed portion (gap) is cut on the side first contacting with the projected portion. In this case, the corner portion is made smooth. Thus, the projected and recessed portions tend to smoothly fit to each other and overlapping of the fitting portions of the mat tends to be prevented. As a result, the holding sealing material tends to prevent leakage of exhaust gas in the case that it is used for the exhaust gas treating unit such as a catalyst supporting carrier and an exhaust gas filter.

In the case that the holding sealing material according to the embodiment of the present invention satisfies the feature (C), the projected portion has a shape of a quadrangle in the cross-sectional view perpendicular to the longitudinal direction. The quadrangle is cut at least one corner portion on the side opposite to the member to be wrapped. In this case, the corner portion is made smooth. Thus, the projected and recessed portions tend to smoothly fit to each other and overlapping of the fitting portions of the mat tends to be prevented even though slight displacement occurs due to deformation of the mat when a single mat is rolled around the periphery of a member to be wrapped or slight displacement occurs between the mats in the width direction when multiple mats are rolled around the periphery of a member to be wrapped. As a result, the holding sealing material tends to prevent leakage of exhaust gas in the case that it is used in the exhaust gas purifying apparatus.

In this case, it may become easier to achieve the aforementioned effects by rolling the holding sealing material around the periphery of the member to be wrapped such that the side having the projected portion is brought close to the member to be wrapped and then the recessed portion is allowed to fit to the recessed portion.

In the case that the holding sealing material according to the embodiment of the present invention satisfies the feature (D), the recessed portion is a gap between two quadrangles in the cross-sectional view perpendicular to the longitudinal direction. At least one of the quadrangles is cut at a corner portion closer to the gap and on the side of the member to be wrapped. In other words, either corner portion of the quadrangles adjacent to the recessed region (the gap) is cut. In this case, the corner portion is made smooth. Thus, the projected and recessed portions tend to smoothly fit to each other and overlapping of the fitting portions of the mat tends to be prevented even though slight displacement occurs due to deformation of the mat when a single mat is rolled around the periphery of a member to be wrapped or slight displacement occurs between the mats in the width direction when multiple mats are rolled around the periphery of a member to be wrapped. As a result, the holding sealing material tends to prevent leakage of exhaust gas in the case that it is used in an exhaust gas purifying apparatus.

In the case that the holding sealing material according to the embodiment of the present invention satisfies the feature (A), the quadrangle of the projected portion is preferably cut at the two corner portions on the side of the member to be wrapped in the cross-sectional view perpendicular to the longitudinal direction. Since the two corner portions are cut in this case, the corner portions are made smooth. Thus, the projected and recessed portions tend to smoothly fit to each other and overlapping of the fitting portions of the mat tends to be prevented even though slight displacement occurs due to deformation of the mat when a single mat is rolled around the periphery of a member to be wrapped or slight displacement occurs between the mats in the width direction when multiple mats are rolled around the periphery of a member to be wrapped. As a result, the holding sealing material tends to prevent leakage of exhaust gas in the case that it is used for an exhaust gas treating unit.

Here, the holding sealing material satisfying the feature (A) is one as follows: the holding sealing material includes a mat including an inorganic fibrous material; in a plan view, the mat has a basic quadrangular shape consisting of long sides extending in a longitudinal direction and short sides substantially perpendicular to the long sides; the mat has a recessed portion at one of the short sides and has a projected portion at the other of the short sides, whereby the projected and recessed portions should fit to each other when the mat is rolled around the periphery of a member to be wrapped; and (A) in the cross-sectional view, the projected portion has a shape of a quadrangle and the quadrangle is cut at least one corner portion on the side of the member to be wrapped.

In the case that the holding sealing material according to the embodiment of the present invention satisfies the feature (A), in the cross-sectional view perpendicular to the longitudinal direction, the holding sealing material preferably satisfies d1/D1=0.1 to 0.6 at the projected portion, wherein, assuming that one of the long sides substantially parallel to the surface of the member to be wrapped is Long side A and the short side substantially perpendicular to Long side A is Short side B in the uncut quadrangle of the projected portion, d1 represents the distance between the intersection point of the cut line with Short side B and the end point of Short side B closer to the member to be wrapped, and D1 represents the length of Short side B. Thus, the volume of the removed portion tends not to be too large.

If d1/D1 is 0.6 or smaller, the volume of the removed portion tends not to be too large. Thus, the mat having a chamfer is less likely to have a low repulsive force, the mat tends not to have a low power for holding the wrapped member, and leakage of exhaust gas is less likely to occur when the mat is rolled around the periphery of a member to be wrapped. As a result, leakage of exhaust gas tends to be surely prevented in the holding sealing material according to the embodiment of the present invention.

If d1/D1 is 0.1 or greater, the volume of the removed portion is not small. Thus, it may become easier to achieve the effect that the projected portion 13a appropriately fits to the recessed portion 13b.

In the case that the holding sealing material according to the embodiment of the present invention satisfies the feature (A), the corner portion on the side of the member to be wrapped is preferably linearly cut, and the extension line of the side closest to the member to be wrapped preferably forms an angle α of 25° to 80° with the cut line. In this case, the corner portion is made smooth. Thus, the projected and recessed portions tend to smoothly fit to each other and overlapping of the fitting portions of the mat tends to be prevented even though slight displacement occurs due to deformation of the mat when a single mat is rolled around the periphery of a member to be wrapped or slight displacement occurs between the mats in the width direction when multiple mats are rolled around the periphery of a member to be wrapped. As a result, the holding sealing material tends to prevent leakage of exhaust gas in the case that it is used for the exhaust gas treating unit.

In the case that the holding sealing material according to the embodiment of the present invention satisfies the feature (A) or (B), in the cross-sectional view perpendicular to the longitudinal direction, the projected portion is preferably a trapezoid in which the side closest to the member to be wrapped is shorter than the opposite side, and the recessed portion preferably has a shape such that the projected and recessed portions fit to each other. In this case, the recessed portion is wider at the side opposite to the member to be wrapped than at the other side. Thus, the projected portion tends to smoothly fit to the recessed portion and overlapping of the fitting portions of the mat tends to be prevented even though slight displacement occurs due to deformation of the mat when a single mat is rolled around the periphery of a member to be wrapped or slight displacement occurs between the mats in the width direction when multiple mats are rolled around the periphery of a member to be wrapped. As a result, the holding sealing material tends to prevent leakage of exhaust gas in the case that it is used for the exhaust gas treating unit.

Here, the holding sealing material satisfying the feature (B) is one as follows: the holding sealing material includes a mat including an inorganic fibrous material; in a plan view, the mat has a basic quadrangular shape consisting of long sides extending in a longitudinal direction and short sides substantially perpendicular to the long sides; the mat has a recessed portion at one of the short sides and has a projected portion at the other of the short sides, whereby the projected and recessed portions should fit to each other when the mat is rolled around the periphery of a member to be wrapped; and (B) in the cross-sectional view, the recessed portion is a gap between two quadrangles and at least one of the quadrangles is cut at a corner portion closer to the gap on the side opposite to the member to be wrapped.

In the case that the holding sealing material according to the embodiment of the present invention satisfies the feature (B), in the cross-sectional view, the two quadrangles adjacent to the recessed portion each are preferably cut at a corner portion closer to the gap on the side opposite to the member to be wrapped. Since both of the quadrangles adjacent to the recessed region (the gap) are cut at the corner portion in this case, the projected portion tends to more smoothly fit to the recessed portion and overlapping of the fitting portions of the mat tends to be prevented. As a result, the holding sealing material tends to prevent leakage of exhaust gas in the case that it is used for the exhaust gas treating unit.

In the case that the holding sealing material according to the embodiment of the present invention satisfies the feature (B), in the cross-sectional view perpendicular to the longitudinal direction, the holding sealing material preferably satisfies d2/D2=0.1 to 0.6 at the recessed portion, wherein, assuming that one of the long sides substantially parallel to the surface of the member to be wrapped is Long side E and the short side substantially perpendicular to Long side E is Short side F in the uncut quadrangle, d2 represents the distance between the intersection point of the cut line with Short side F and the end point of Short side F further from the member to be wrapped, and D2 represents the length of Short side F. In this case, the volume of the removed portion tends not to be too large. Thus, the mat having a chamfer is less likely to have a low repulsive force, the mat tends not to have a low power for holding the wrapped member, and leakage of exhaust gas is less likely to occur when the mat is rolled around the periphery of a member to be wrapped.

In the case that the holding sealing material according to the embodiment of the present invention satisfies the feature (B), the corner portion closer to the gap on the side opposite to the member to be wrapped is preferably linearly cut, and the extension line of the side opposite to the member to be wrapped preferably forms an angle β of 25° to 80° with the cut line. In this case, the corner portion is made smooth. Thus, the projected and recessed portions tend to smoothly fit to each other and overlapping of the fitting portions of the mat tends to be prevented even though slight displacement occurs due to deformation of the mat when a single mat is rolled around the periphery of a member to be wrapped or slight displacement occurs between the mats in the width direction when multiple mats are rolled around the periphery of a member to be wrapped. Thus, the holding sealing material tends to prevent leakage of exhaust gas in the case that it is used for the exhaust gas treating unit.

The holding sealing materials according to the embodiments of the present invention described hereinbelow each include four types of embodiments, that is, a type satisfying the feature (A), a type satisfying the feature (B), a type satisfying the feature (C), and a type satisfying the feature (D).

The holding sealing material satisfying the feature (C) is one as follows: the holding sealing material includes a mat including an inorganic fibrous material; in a plan view, the mat has a basic quadrangular shape consisting of long sides extending in a longitudinal direction and short sides substantially perpendicular to the long sides; the mat has a recessed portion at one of the short sides and has a projected portion at the other of the short sides, whereby the projected and recessed portions should fit to each other when the mat is rolled around the periphery of a member to be wrapped; and in the cross-sectional view, the projected portion has a quadrangle and the quadrangle is cut at at least one corner portion on the side opposite to the member to be wrapped.

The holding sealing material satisfying the feature (D) is as follows: the holding sealing material includes a mat including an inorganic fibrous material; in a plan view, the mat has a basic quadrangular shape consisting of long sides extending in a longitudinal direction and short sides substantially perpendicular to the long sides; the mat has a recessed portion at one of the short sides and has a projected portion at the other of the short sides, whereby the projected and recessed portions should fit to each other when the mat is rolled around the periphery of a member to be wrapped; and (D) in the cross-sectional view, the recessed portion being a gap between two quadrangles and at least one of the quadrangles being cut at a corner portion closer to the gap on the side of the member to be wrapped.

A holding sealing material according to an embodiment of the present invention includes a laminate of mats, and each of the mats includes at least one of the mats for forming the holding sealing material. In this case, one of the mats disposed closest to the member to be wrapped is shortest in the longitudinal direction, and the other mats are disposed in increasing order of length. When the mats are rolled around the periphery of a member to be wrapped, each mat is in close contact with other mats at the short sides and a gap is hardly formed. Thus, the holding sealing material tends to prevent leakage of exhaust gas at the ends of the mat in the case that it is used for the exhaust gas treating unit.

In the holding sealing material according to the embodiment of the present invention, in the cross-sectional view perpendicular to the longitudinal direction of the laminate of the mats, the projected portions of the mats preferably integrally form a trapezoidal shape and the recessed portions of the mats preferably integrally form a shape such that the projected and recessed portions fit to each other when the laminate of the mats is rolled around the periphery of the member to be wrapped. In other words, the mats are preferably designed such that the projected portions integrally form a trapezoidal shape when laminated. In this case, the recessed portions of the mats tend to be laminated at one time on the member to be wrapped and then the projected portions of the mats tend to be allowed to fit to the recessed portions.

In the holding sealing material according to the embodiment of the present invention, the mats are preferably fixed to each other by at least one fixing portion. In this case, the fixing portion is disposed perpendicularly to the direction of rolling the holding sealing material around the periphery of the exhaust gas treating unit. Thus, the fixing portion tends to prevent difficulty in rolling the holding sealing material due to tensile stress which occurs especially at the periphery, and tends to allow the holding sealing material to be well rolled. The fixing portion tends to further prevent curling up of the mats from the long sides and displacement of the mats.

In the holding sealing material according to the embodiment of the present invention, the mats are preferably fixed to each other by at least two fixing portions. In the case that the fixing portions are projected on the side view, the at least two fixing portions are preferably disposed at different positions in the longitudinal direction. In this case, the fixing portions tend to prevent displacement of the mats in the width direction. In the case of one fixing portion, the fixing portion serves as the center of displacement and is likely to cause displacement of the mats in the width direction. This is presumably because the ends of the holding sealing material is allowed to freely move in the width direction when the ends of the holding sealing material are seen from the fixing portion, and thus the mats are less likely to be prevented from displacement in the width direction. In contrast, at least one another fixing portion is formed in the holding sealing material according to the embodiment of the present invention and the fixing portions are disposed at different positions in the longitudinal direction in the side view with the fixing portions projected thereon. In this case, a fixing end is disposed on the side of at least one end of the holding sealing material when the ends are seen from each fixing portion. Thus, displacement in the width direction is greatly prevented. As a result, displacement of the mats in the width direction tends to be prevented in the holding sealing material according to the embodiment of the present invention. In addition, this prevention of displacement of the mats tends to lead to good handleability of the holding sealing material when the holding sealing material is rolled around the exhaust gas treating unit, and improved workability with the holding sealing material.

Here, the phrase "the fixing portion(s) is(are) projected on the side view" or the like phrases derived therefrom means that the fixing portions are projected on the side view of the mat along the longitudinal direction.

In the holding sealing material according to the embodiment of the present invention, the fixing portions each preferably extend in the width direction perpendicular to the longitudinal direction of the mats. In this case, the fixing portions are disposed perpendicularly to the direction of rolling the holding sealing material around the periphery of the exhaust gas treating unit. Thus, the fixing portions tend to prevent difficulty in rolling the holding sealing material due to tensile stress which occurs especially at the periphery of a member to be wrapped, and tend to allow the holding sealing material to be well rolled. The fixing portions tend to further prevent curling up of the mat from the long sides and displacement of the mats.

In the holding sealing material according to the embodiment of the present invention, the fixing portion is or the fixing portions are preferably separated from at least one of the long side faces of the mats. In this case, the fixing portion does not extend across the width, and at least one of the long side faces is not fixed. If the fixing portion reaches a long side face, the long side face is rubbed when the holding sealing material is handled or stress is applied to the vicinity of the long side face. As a result, the holding sealing material may be damaged at the ends of the formed fixing portion. In contrast, the fixing portion separated from a long side face tends to suppress local stress which would occur if the fixing portion reached the long side face. Thus, damages on the mats tend to be prevented.

In the holding sealing material according to the embodiment of the present invention, at least the fitting regions of the projected portion of the mat are preferably covered with a combustible film. In this case, the fitting regions of the projected portion of the mat each have a surface formed by the film. Thus, the fitting regions covered with the film are made smoother than the fitting regions with the fibrous material exposed on the surface. As a result, the projected and recessed portions tend to smoothly fit to each other.

In the holding sealing material according to the embodiment of the present invention, the whole of the mat or the whole of the laminate of the mats is preferably covered with a combustible film. In this case, in addition to the above effects, the holding sealing material tends to easily maintain the shape of the mats. Thus, workability tends to be improved upon rolling the holding sealing material around the periphery of a member to be wrapped. Further, the holding sealing material tends to prevent scattering of the fibrous material included in the mats.

The combustible film may be a breathable one or may be a non-breathable one.

The holding sealing material with the mat covered with a breathable film is held at normal pressure, and the combustible film has extensibility. Thus, the holding sealing material is easily rolled around the periphery of a member to be wrapped. In the holding sealing material with the mat covered with a non-breathable film, the mat is sealed by the film. Thus, the mat tends to be advantageously kept in a compressed state without the use of adhesive after sealed by the film under pressure. The wrapped member tends to be surely held by the mat after the film is decomposed by factors such as heat of exhaust gas and the mat is released from the compressed state due to the film.

In the case that the holding sealing material according to the embodiment of the present invention includes the laminate of the mats, the whole laminate may be covered with a single bag-shaped combustible film, or each mat of the holding sealing material may be covered with a bag-shaped combustible film.

In the case that each mat is covered with a combustible film, the mats are made smooth. Thus, the holding sealing material tends to be more favorably rolled around the periphery of a member to be wrapped.

In the holding sealing material according to the embodiment of the present invention, the mat preferably includes a binding material. In this case, the mat tends to be kept in a compressed state after impregnated with a binding material which includes constituents such as an organic binder; compressed by application of heat and pressure; and cooled down. The wrapped member tends to be more firmly held by the mat after the organic binder is decomposed by factors such as heat of exhaust gas and the mat is released from the compressed state due to the organic binder.

In the holding sealing material according to the embodiment of the present invention, the mat is preferably needle-punched. Thus, constituent materials of the mat, such as the inorganic fibrous material, are less likely to be separated. In addition, the mat needle-punched in the width direction perpendicular to the longitudinal direction has creases along the needle-punched portions in the width direction. Thus, the holding sealing material tends to be easily rolled around the periphery of a member to be wrapped when rolled around a member to be wrapped.

In the holding sealing material according to the embodiment of the present invention, the inorganic fibrous material preferably includes a mixture of alumina and silica. Thus, the holding sealing material tends to be excellent in properties such as heat resistance and elasticity, and in performance for holding the wrapped member.

In the holding sealing material according to the embodiment of the present invention, the member to be wrapped is preferably a catalyst supporting carrier or an exhaust gas filter.

A method for rolling the holding sealing material according to the embodiments of the present invention around the periphery of a member to be wrapped according to an embodiment of the present invention includes bringing the side having the recessed portion close to the periphery of the member; rolling the holding sealing material around the periphery of the member to be wrapped; and fitting the projected portion to the recessed portion. Thereby, the mat tends to be favorably rolled around the periphery of a member to be wrapped. When the holding sealing material including the laminate of the mats is rolled around the periphery of a member to be wrapped, fitting of the projected and recessed portions may be performed at each mat. Alternatively, the recessed portions of the mats may be laminated at one time on a member to be wrapped, and then the projected portions of the mats may be allowed to fit to the recessed portions.

An exhaust gas purifying apparatus according to an embodiment of the present invention includes a pillar-shaped exhaust gas treating unit; a casing; and a holding sealing material. The exhaust gas treating unit includes cells disposed in parallel in the longitudinal direction of the unit with cell walls interposed therebetween. The casing accommodates the exhaust gas treating unit. The holding sealing material is disposed between the exhaust gas treating unit and the casing and holds the exhaust gas treating unit. The exhaust gas treating unit is the member to be wrapped by the holding sealing material including at least one mat. The holding sealing material is any one of the holding sealing materials according to the embodiments of the present invention.

In the exhaust gas purifying apparatus according to the embodiment of the present invention, the holding sealing material according to the embodiments of the present invention is used. In this case, a corner portion is made smooth. Thus, the projected and recessed portions smoothly fit to each other and overlapping of the fitting portions of the mat is prevented even though slight displacement occurs due to deformation of the mat when a single mat is rolled around the periphery of a member to be wrapped or slight displacement occurs between the mats in the width direction when multiple mats are rolled around the periphery of a member to be wrapped. Thus, the whole exhaust gas treating apparatus tends to prevent leakage of exhaust gas and tends to be prevented from reduction in durability.

In the exhaust gas purifying apparatus according to the embodiment of the present invention, the exhaust gas treating unit is preferably a catalyst supporting carrier or an exhaust gas filter.

The phrase "the recessed and projected portions fit to each other" and the like phrases used in the embodiments means that, when the holding sealing material is rolled around the periphery of a member to be wrapped and the projected portion is inserted into the recessed portion, the projected portion is sufficiently put into the recessed portion and the holding sealing material is allowed to keep wrapping the member. The state that the projected and recessed portions fit to each other includes not only a state in which all of the side faces (the faces between the front and back surfaces) of the projected portion is in contact with the inner side faces of the recessed portion (state of perfect fitting), but also a state in which a slight gap is made between the recessed and projected portions or between the ends of the mat. The slight gap specifically means a gap with a width of 1 to 10 mm. Such a gap is a designed one formed in consideration of the dimensional tolerance between the holding sealing material and a member to be wrapped in the case that the member to be wrapped is the exhaust gas treating unit.

In the case that the holding sealing material of the present invention is used for the exhaust gas treating unit as mentioned above, the holding sealing material thermally expands when used, or the holding sealing material wrapping the exhaust gas treating unit is compressed and expands in the circumferential direction to almost perfectly fill the gap when put into the casing. Thus, the holding sealing material tends to sufficiently prevent leakage of exhaust gas.

First Embodiment

Referring to the drawings, the following will describe the holding sealing material, the method for rolling the holding sealing material around a member to be wrapped, and the exhaust gas purifying apparatus according to a first embodiment of the present invention.

FIG. 1A is a perspective view schematically showing the holding sealing material of the first embodiment of the present invention; and FIG. 1B is an A-A line cross-sectional view of the holding sealing material shown in FIG. 1A.

Figure 2B:
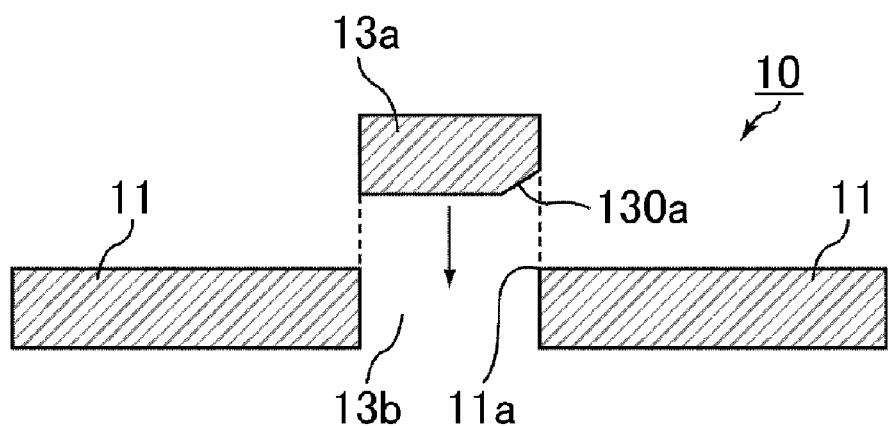
FIG. 2B is a cross-sectional view perpendicular to the longitudinal direction schematically showing the holding sealing material shown in FIG. 2A when rolled around the periphery of the member to be wrapped and immediately before the projected and recessed portions fit to each other.

FIG. 2A is a perspective view schematically showing the holding sealing material of the first embodiment of the present invention when rolled around the periphery of a member to be wrapped and immediately before projected and recessed portions fit to each other; and FIG. 2B is a cross-sectional view perpendicular to the longitudinal direction schematically showing the holding sealing material shown in FIG. 2A when rolled around the periphery of the member to be wrapped and immediately before the projected and recessed portions fit to each other.

As shown in FIG. 1A, the holding sealing material 10 of the present embodiment includes a mat 11 having a substantially quadrangular shape consisting of long sides extending in the longitudinal direction and short sides substantially perpendicular to the long sides in the plan view.

In FIG. 1A, the length of each long side of the mat 11 (hereinafter, also simply referred to as the length) is indicated by the arrow L1; the length of the short side thereof (hereinafter, also referred to as the width) is indicated by the arrow W1; and the thickness of the mat is indicated by the arrow D1.

One of the short sides (hereinafter, also referred to as the ends) of the mat 11 has a projected portion 13a, and the other of the short sides has a recessed portion 13b. The projected portion 13a and the recessed portion 13b of the mat 11 are designed to fit to each other when the holding sealing material 10 is rolled around a member to be wrapped such as a catalyst supporting carrier or an exhaust gas filter.

In the holding sealing material 10 shown in FIG. 1A, the thickness D1 of the mat 11 is generally 3 to 13 mm; the length L1 thereof is generally preferably 200 to 1300 mm; and the width W1 thereof is preferably 30 to 400 mm. The length (L11) of the projected portion 13a and the length (L13) of the recessed portion 13b each are preferably 10 to 100 mm; the width (W11) of the projected portion 13a and the width (W13) of the recessed portion 13b each are preferably 10 to 300 mm.

As shown in FIG. 2A, the holding sealing material is rolled around an exhaust gas treating unit 200, which is one example of the member to be wrapped, so that one principal surface of the mat 11 is in contact with the unit. Here, the length L1 is the same as the perimeter of the exhaust gas treating unit 200. Thus, the ends of the mat 11 are in contact with each other and the projected portion 13a fits to the recessed portion 13b when the holding sealing material is rolled around the exhaust gas treating unit 200.

As shown in FIG. 1B, the projected portion 13a of the mat 11 in the holding sealing material 10 of the present embodiment has a shape of a quadrangle in the cross-sectional view perpendicular to the longitudinal direction. At least one corner portion of the quadrangle is linearly cut on the side of the member to be wrapped (the side of the exhaust gas treating unit 200), and thereby the projected portion is allowed to have a chamfer 130a.

The shape of the projected portion 13a of the mat 11 in the cross-sectional view perpendicular to the longitudinal direction is specifically described not only in the present embodiment but also in the following embodiments. The general shape thereof is described as follows.

The shape of the chamfer 130a is not particularly limited, and the chamfer may have a straight line (a bevel) as shown in FIG. 1B or may have a curved line (a fillet).

In the cross-sectional view of the projected portion 13a of the mat 11 perpendicular to the longitudinal direction, the two corner portions of the quadrangle may be cut on the side of the member to be wrapped.

The projected portion 13a of the mat 11 may be a trapezoid in which the side closest to the member to be wrapped (the upper base) is shorter than the opposite side (the lower base) in the cross-sectional view perpendicular to the longitudinal direction, and the recessed portion 13b of the mat 11 may have a shape such that the recessed portion 13b perfectly fits to the projected portion 13a of the mat 11 in the cross-sectional view perpendicular to the longitudinal direction.

At the projected portion 13a shown in FIG. 1B, the holding sealing material preferably satisfies $d1/D1=0.1$ to 0.6 wherein, assuming that the long sides substantially parallel to the surface of the exhaust gas treating unit 200 are Long sides A1 and A2 and the short sides substantially perpendicular to Long sides A1 and A2 are Short sides B1 and B2, d1 represents the distance between the intersection point B11 of the cut line with Short side B1 and the end point of Short side B1 closer to the exhaust gas treating unit 200, and D1 represents the length of Short side B (the thickness of the mat).

If $d1/D1$ is 0.6 or smaller, the volume of the removed portion is less likely to be too large and the mat having the chamfer is less likely to have a low repulsive force when the mat is rolled around the periphery of a member to be wrapped. Thus, the mat is less likely to have a low power for holding the wrapped member and leakage of exhaust gas is less likely to occur.

If $d1/D1$ is 0.1 or greater, the volume of the removed portion is not small. Thus, it may become easier to achieve the effect that the projected portion 13a more smoothly fit to the recessed portion 13b.

More preferably, $d1/D1$ is 0.2 to 0.5.

The extension line of the side A2, which is closest to the exhaust gas treating unit 200, preferably forms an angle α of 25° to 80° with the cut line.

The angle α of 25° to 80° is an appropriately adjusted angle and tends to allow the projected portion 13a to smoothly fit to the recessed portion 13b of the mat 11.

If the angle α is 25° or greater, the cut line tends to form a sufficient angle with the side A2. Thus, it may become easier to achieve the effect that the projected portion 13a smoothly fits to the recessed portion 13b of the mat 11. If the angle α is 80° or smaller, the cut line tends to form a sufficient angle with the side B1. Thus, it may become easier to achieve the effect that the projected portion 13a also smoothly fit to the recessed portion 13b of the mat 11.

The angle α is more preferably 25° to 60°.

The mat 11 for the holding sealing material 10 of the present embodiment is obtained by various methods. For example, the mat may be obtained by the following method: a mixture for spinning is prepared which includes materials such as basic aqueous solution of aluminum chloride and silica sol; the mixture is spun by blowing to provide a precursor for the inorganic fibrous material having an average fiber diameter of 3 to 10 μm; the precursor for the inorganic fibrous material is compressed to provide a continuous sheet having a predetermined size; the sheet is needle-punched and then fired to provide a fired sheet; the fired sheet is cut, immersed in an organic binder containing a substance such as an acrylic resin, compressed and dried, and cut into a predetermined shape; thereby, the aforementioned mat is obtained. The treatment "needle-punching" used herein means a treatment in which fiber-tangling means, such as a needle, is inserted into and extracted from the sheet of the precursor of the inorganic fibrous material. In the mat 11, an inorganic fibrous material having a relatively long average fiber length is three-dimensionally tangled by needle-punching. This mat is needle-punched in the width direction perpendicular to the longitudinal direction.

The inorganic fibrous material is required to have an average fiber length sufficient to be tangled. For example, the average fiber length of the inorganic fibrous material is preferably 50 μm to 100 mm.

The holding sealing material 10 of the present embodiment may further contain a binding material such as an organic binder in order to reduce the bulk of the holding sealing material or to improve handleability of the holding sealing material before rolling of the holding sealing material around a member to be wrapped.

The following will describe the method for rolling the aforementioned holding sealing material of the present embodiment around a member to be wrapped.

The member to be wrapped may be, but not limited to, a catalyst supporting carrier or an exhaust gas filter, as mentioned above. Alternatively, the member to be wrapped may be other devices such as a muffler.

When the holding sealing material of the present embodiment is rolled around the periphery of a member to be wrapped, it is effective to first bring the side having the recessed portion close to the member to be wrapped and then lead the projected portion to fit to the recessed portion.

FIG. 2A is a perspective view schematically showing the holding sealing material of the first embodiment of the present invention when rolled around the periphery of a member to be wrapped and immediately before projected and recessed portions fit to each other; and FIG. 2B is a cross-sectional view perpendicular to the longitudinal direction schematically showing the holding sealing material shown in FIG. 2A when rolled around the periphery of the member to be wrapped and immediately before the projected and recessed portions fit to each other.

As shown in FIGS. 2A and 2B, the mat 11 is rolled around the periphery of the exhaust gas treating unit 200 by the steps of bringing the principal surface of the mat 11 to be in contact with the periphery of the exhaust gas treating unit 200, bringing the side of the recessed portion 13b close to the exhaust gas treating unit 200, and fitting the projected portion 13a to the recessed portion 13b.

In this case, the projected portion 13a of the mat 11 has the chamfer 130a, and the chamfer is less likely to be caught by the corner 11a of the recessed portion 13b. Even though slight displacement of the mat 11 occurs in the width direction, the chamfer 130a slides and the projected portion 13a is smoothly inserted into the recessed portion 13b. Thus, the projected portion 13a tends to be allowed to smoothly fit to the recessed portion 13b.

Figure 3A:
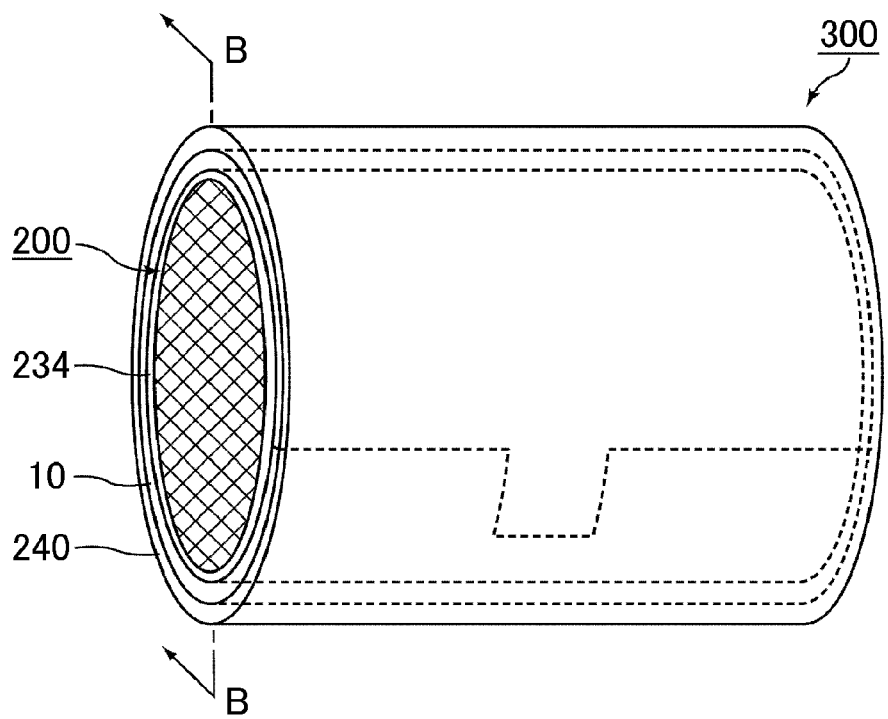
FIG. 3A is a perspective view schematically showing an exhaust gas purifying apparatus of the first embodiment of the present invention.
Figure 3B:
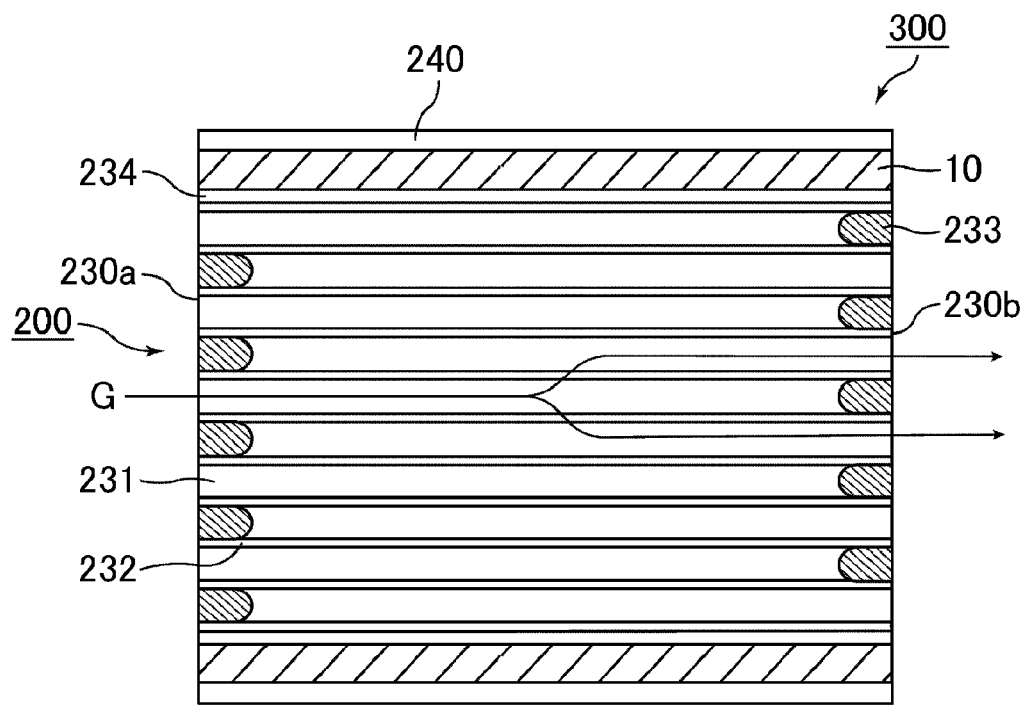
FIG. 3B is a B-B line cross-sectional view of the exhaust gas purifying apparatus shown in FIG. 3A.

Referring to FIGS. 3A and 3B, the following will describe the exhaust gas purifying apparatus of the present embodiment including the holding sealing material of the present embodiment.

FIG. 3A is a perspective view schematically showing the exhaust gas purifying apparatus of the present embodiment; and FIG. 3B is a B-B line cross-sectional view of the exhaust gas purifying apparatus shown in FIG. 3A.

As shown in FIGS. 3A and 3B, the exhaust gas purifying apparatus 300 includes a pillar-shaped exhaust gas treating unit 200 having cells 231 disposed in parallel in the longitudinal direction with cell walls 232 interposed therebetween; a casing 240 accommodating the exhaust gas treating unit 200; and a holding sealing material 10 disposed between the exhaust gas treating unit 200 and the casing 240 and holding the exhaust gas treating unit 200. If necessary, the casing 240 is coupled with a pipe for introducing exhaust gas into the exhaust gas purifying apparatus from an internal engine at one end and is coupled with a pipe for discharging the exhaust gas to the outside from the exhaust gas purifying apparatus at the other end.

As shown in FIG. 3B, in the exhaust gas purifying apparatus 300 of the present embodiment, the exhaust gas treating unit 200 is a honeycomb filter with either one end of each cell sealed by a plug material 233. The periphery of the honeycomb filter is covered with a sealing material layer (coating layer) 234.

Referring to FIG. 3B, the following will describe the case that exhaust gas passes through the aforementioned exhaust gas purifying apparatus 300.

As shown in FIG. 3B, in the exhaust gas purifying apparatus 300, exhaust gas discharged from an internal engine flows into one cell 231 through an opening on the end face 230a of the exhaust gas treating unit 200 (honeycomb filter), and then passes through the cell wall 232 which separates the cell 231 (in FIG. 3B, the exhaust gas is indicated as G, and the flow route of the exhaust gas is indicated by arrows). At this time, the cell wall 232 captures PM in the exhaust gas, and purifies the exhaust gas. The purified exhaust gas is discharged from another cell 231 through an opening on the end face 230b to the outside.

Figure 4A:
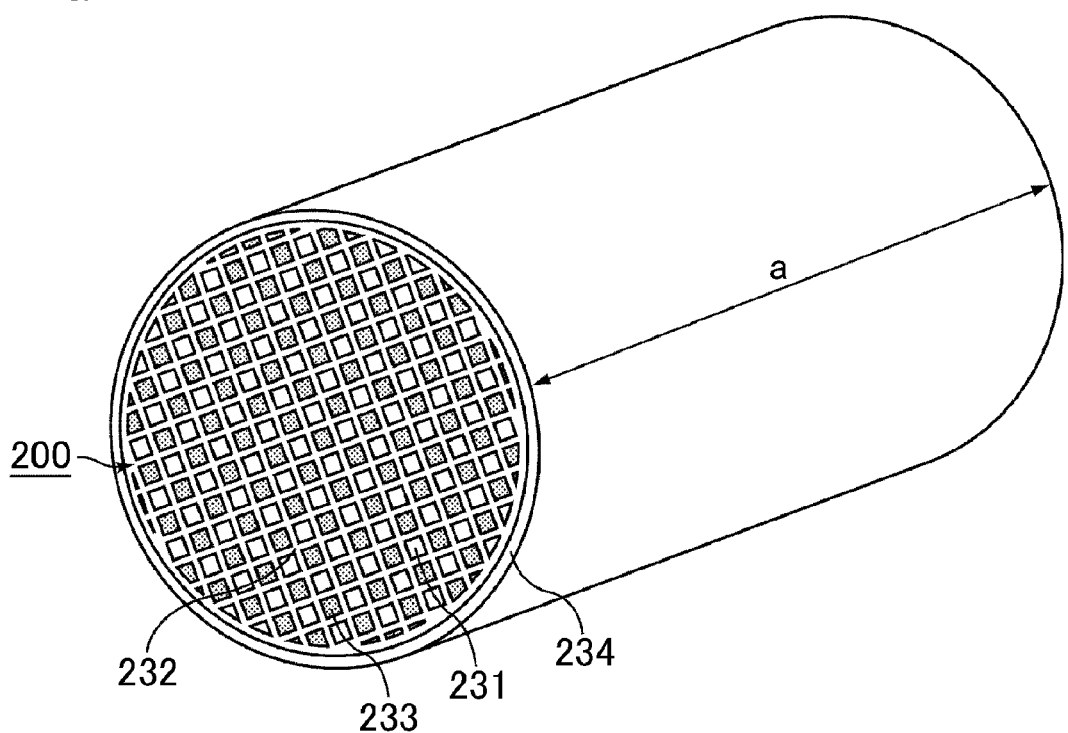
FIG. 4A is a perspective view schematically showing a honeycomb filter for the exhaust gas purifying apparatus of the first embodiment of the present invention.
Figure 4B:
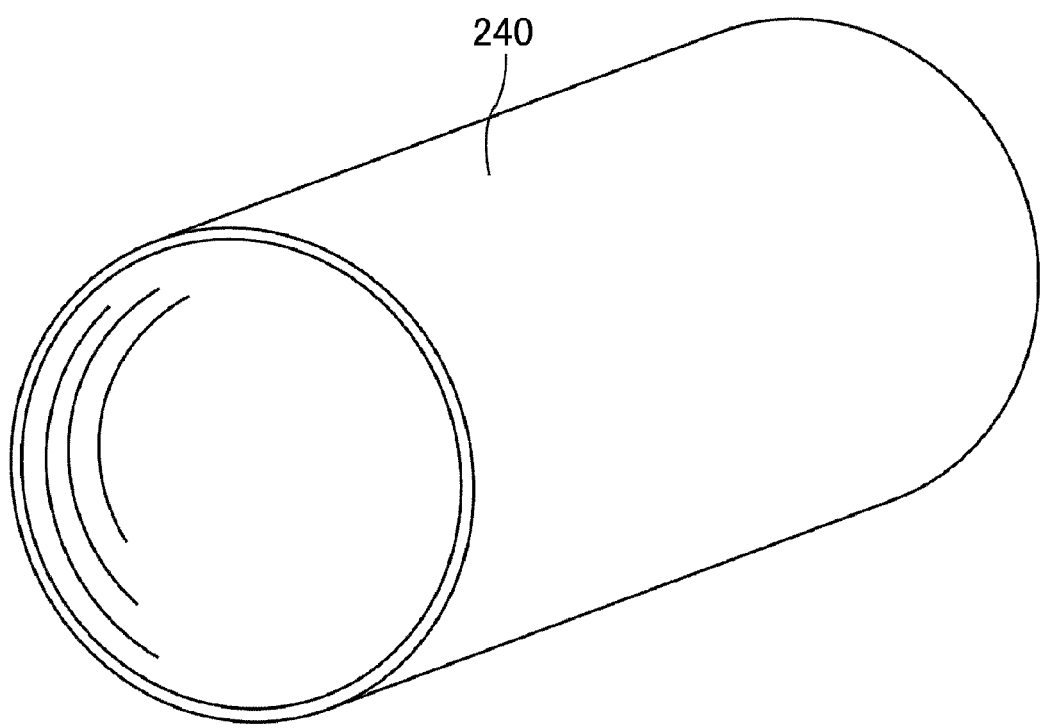
FIG. 4B is a perspective view schematically showing a casing for the exhaust gas purifying apparatus of the first embodiment of the present invention.

Referring to FIGS. 4A and 4B, the following will describe the honeycomb filter and the casing for the exhaust gas purifying apparatus 300. Here, the specification of the holding sealing material is omitted because it is described above.

FIG. 4A is a perspective view schematically showing the honeycomb filter for the exhaust gas purifying apparatus of the first embodiment of the present invention; and FIG. 4B is a perspective view schematically showing the casing for the exhaust gas purifying apparatus 300 of the first embodiment of the present invention.

As shown in FIG. 4A, the honeycomb filter 200 mainly includes a round pillar-shaped porous ceramic. The periphery of the honeycomb filter 200 is covered with a sealing material layer (coating layer) 234 for the purposes of reinforcing the periphery of the honeycomb filter 200, maintaining the shape, and increasing heat insulating properties of the honeycomb filter 200.

Here, the internal structure of the honeycomb filter 200 is as mentioned above in the description of the exhaust gas purifying apparatus of the present embodiment (see FIG. 3B).

The following will describe the casing 240. The casing 240 shown in FIG. 4B mainly includes a cylindrical-shaped metal such as stainless steel, and has a cylindrical shape. The internal diameter of the casing 240 is slightly shorter than the sum of the diameter of the end face of the honeycomb filter 200 and the thickness of the holding sealing material 10 rolled around the honeycomb filter 200. The length of the casing 240 is substantially the same as that of the honeycomb filter 200 in the longitudinal direction (direction of the double-headed arrow a in FIG. 4A).

The following will describe methods for producing the holding sealing material and the exhaust gas purifying apparatus of the present embodiment.

First described is the method for producing the holding sealing material.

As a mat for the holding sealing material, a needle-punched mat is prepared which has a quadrangular shape consisting of long sides extending in the longitudinal direction and short sides substantially perpendicular to the long sides; has a recessed portion at one of the short sides; has a projected portion at the other of the short side; and has a predetermined length, in the plan view. The needle-punched mat is produced as mentioned above through the steps of: spinning the mixture for spinning by blowing to prepare the inorganic fibrous precursor; compressing the inorganic fibrous precursor obtained in the spinning step to prepare the sheet; needle-punching the sheet; firing the needle-punched sheet; immersing the needle-punched sheet in the organic binder; compressing and drying the sheet; and cutting the sheet.

The inorganic fibrous material for the mat is not particularly limited. Examples thereof include alumina-silica fibrous materials, alumina fibrous materials, and silica fibrous materials. The fibrous material to be used may be selected depending on the characteristics required for the sealing material such as heat resistance and weathering resistance. In the case of an alumina-silica fibrous material, the composition ratio between alumina and silica may be 60:40 to 80:20.

The needle-punching treatment may be performed with a needle-punching apparatus. The needle-punching apparatus includes a holding plate which holds the sheet of the inorganic fibrous precursor; and a needle board which is disposed above the holding plate and is reciprocatable in the piercing direction (thickness direction of a base mat). The needle board is provided with a large number of needles. The needle board is moved toward the sheet of the inorganic fibrous precursor placed on the holding plate, and the needles are inserted into and extracted from the sheet of the inorganic fibrous precursor. Thus, the fibers of the inorganic fibrous precursor tend to be tangled. The number of performing the needle-punching step and the number of needles may be adjusted depending on the target properties such as the balk density and the amount per unit area.

Here, the length of the mat to be rolled around the exhaust gas treating unit corresponds to the perimeter of the exhaust gas treating unit. Thus, the length of the mat is determined based on the perimeter of the exhaust gas treating unit. The length of the mat is determined without consideration of the dimensions of the projected and recessed portions to be formed at the ends of the mat. As shown in FIGS. 1B and 2B, the projected portion 13a at the end of the mat is cut to have a shape of a quadrangle with at least one corner portion removed on the side of the exhaust gas treating unit in the plan view perpendicular to the longitudinal direction.

If necessary, a binder is applied to the needle-punched sheet. Application of the binder to the sheet tends to cause the inorganic fibrous material to be further complexly tangled, and also tends to reduce the volume of the mat.

Examples of the binder include emulsions prepared by dispersion of latex such as acrylic latex and rubbery latex in water. The binder is uniformly sprayed to the whole mat, for example, and thereby the binder is applied to the mat.

In order to remove moisture in the binder, the mat is compressed and dried as mentioned above. The drying may be performed at 95° C. to 150° C. for 1 to 30 minutes. The production of the mat of the present embodiment is finished after the drying step.

Figure 5:
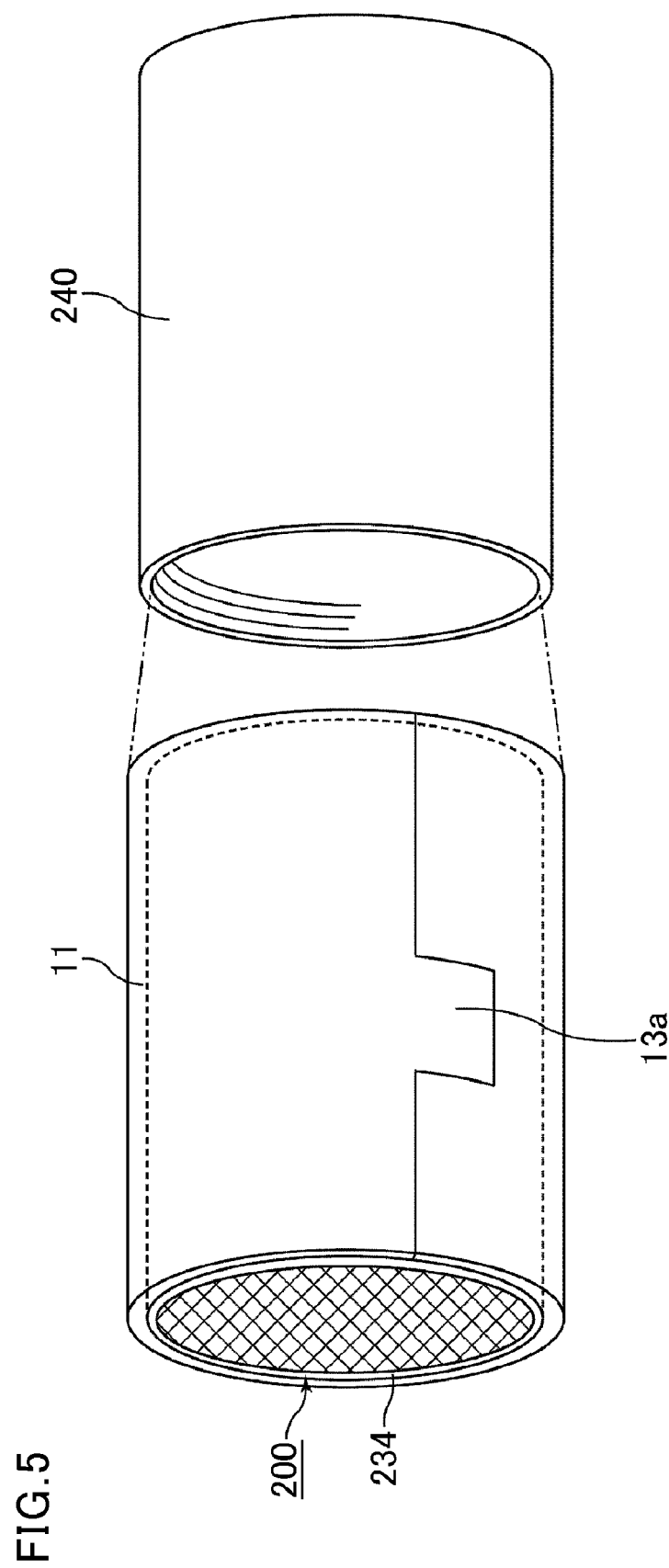
FIG. 5 is a perspective view schematically showing a procedure for producing the exhaust gas purifying apparatus of the first embodiment of the present invention.

Referring to FIG. 5, the following will describe the method for producing the exhaust gas purifying apparatus.

FIG. 5 is a perspective view schematically showing a procedure for producing the exhaust gas purifying apparatus of the first embodiment of the present invention.

A round pillar-shaped honeycomb filter 200 with a sealing material layer 234 disposed thereon is prepared by a conventionally known method. The holding sealing material 10 produced above is rolled around the periphery of the honeycomb filter so that the projected portion 13a and the recessed portion 13b fit to each other.

As shown in FIG. 5, the honeycomb filter 200 wrapped by the holding sealing material 10 is stuffed into the cylindrical casing which has a predetermined size and mainly includes a metal. Thus, the exhaust gas purifying apparatus is produced.

The inner diameter of the casing 240 is slightly shorter than the sum of the outermost diameter of the wrapped honeycomb filter 200 and the thickness of the holding sealing material 10 rolled around the filter so that the press-fitted sealing material is compressed to exert a predetermined repulsive force (in other words, a power to hold the honeycomb filter).

In the holding sealing material of the present embodiment, at least one corner portion of the quadrangle of the projected portion 13a is cut on the side of the honeycomb filter 200 so that the chamfer 130a is formed, as mentioned above. Thus, the projected and recessed portions tend to smoothly fit to each other and overlapping of the fitting portions of the mat tends to be prevented even though slight displacement occurs due to deformation of the mat when a single mat is rolled around the periphery of the honeycomb filter or slight displacement occurs between the mats in the width direction when multiple mats are rolled around the periphery of the honeycomb filter. As a result, leakage of exhaust gas and other problems tend to be prevented at the ends of the mat.

As shown in FIGS. 2A and 2B, a single mat is used in the above description. The present embodiment is not limited to this mode, and two or more of the same mats may be used in the present embodiment. The case of two or more mats will be described in other embodiments.

The following will list the effects of the holding sealing material, the method for rolling the holding sealing material around a member to be wrapped, and the exhaust gas purifying apparatus of the present embodiment.

(1) In the holding sealing material of the present embodiment, the projected portion of the mat for the holding sealing material has a shape of a quadrangle in the cross-sectional view perpendicular to the longitudinal direction, and at least one corner portion of the quadrangle is cut on the side of the member to be wrapped. In other words, a triangular prism is cut out from at least the corner portion of the projected portion of the mat formed by the principal surface and the side face on the side of the member to be wrapped. In this case, the corner portion is smoother than a conventional right-angle corner. Thus, the recessed and projected portions tend to smoothly fit to each other and overlapping of the fitting portions of the mat tends to be prevented even though slight displacement occurs due to deformation of the mat when a single mat is rolled around the periphery of a member to be wrapped or slight displacement occurs between the mats in the width direction when multiple mats are rolled around the periphery of a member to be wrapped. As a result, the holding sealing material tends to prevent leakage of exhaust gas in the case that it is used for an exhaust gas treating unit such as a catalyst supporting carrier and an exhaust gas filter.

(2) The holding sealing material of the present embodiment satisfies d1/D1=0.1 to 0.6 wherein, assuming that the long side substantially parallel to the surface of the member to be wrapped is Long side A and the short side substantially perpendicular to Long side A is Short side B in the uncut quadrangle of the projected portion, d1 represents the distance between the intersection point of the cut line with Short side B and the end point of Short side B closer to the member to be wrapped, and D1 represents the length of Short side B. That is, the volume of the removed portion tends not to be too large. In this case, the repulsive force is not low at the chamfer when the mat is rolled around a member to be wrapped. Thus, the power for holding the wrapped member is not reduced and leakage of exhaust gas tends to be securely prevented.

(3) In the holding sealing material of the present embodiment, the corner portion is linearly cut on the side of the member to be wrapped, and the extension line of the side closest to the member to be wrapped forms an angle α of 25° to 80° with the cut line. In this case, the corner portion is made smooth. Thus, the projected and recessed portions tend to smoothly fit to each other and overlapping of the fitting portions of the mat tends to be prevented even though slight displacement occurs due to deformation of the mat when a single mat is rolled around the periphery of a member to be wrapped or slight displacement occurs between the mats in the width direction when multiple mats are rolled around the periphery of a member to be wrapped. As a result, the holding sealing material tends to prevent leakage of exhaust gas in the case that it is used for the exhaust gas treating unit.

(4) In the holding sealing material of the present embodiment, the mat is needle-punched. Thus, the mat is less likely to be separated and tends to maintain a predetermined shape. In the case that the mat is needle-punched in the width direction perpendicular to the longitudinal direction, the mat has creases along the needle-punched portions in the width direction. Thus, the holding sealing material is easily rolled around the periphery of a member to be wrapped.

(5) In the holding sealing material of the present embodiment, the inorganic fibrous material includes an alumina-silica complex. Thus, the holding sealing material is excellent in properties such as heat resistance and elasticity, and in performance for holding a member to be wrapped.

(6) In the method for rolling the holding sealing material around the periphery of a member to be wrapped of the present embodiment, the side having the recessed portion is first brought close to the member to be wrapped and then the projected portion is allowed to fit to the recessed portion when the holding sealing material is rolled around the periphery of the member to be wrapped. Thereby, the holding sealing material tends to be favorably rolled around the periphery of a member to be wrapped, and the projected portion tends to be allowed to smoothly fit to the recessed portion.

Second Embodiment

The following will describe the holding sealing material, the method for rolling the holding sealing material around a member to be wrapped, and the exhaust gas purifying apparatus according to a second embodiment of the present invention referring to the drawings.

The present embodiment shows a holding sealing material which is similar to that of the first embodiment of the present invention except for the shape of the projected portion of the mat. Specific description of the structure is omitted herein except for the shape of the projected portion of the mat because the structure other than the shape of the projected portion is the same as that of the first embodiment of the present invention.

Figure 6:
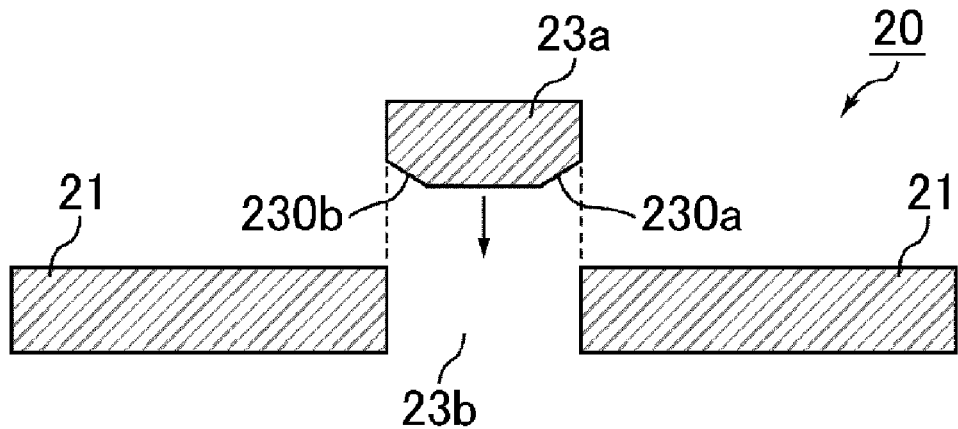
FIG. 6 is a cross-sectional view perpendicular to the longitudinal direction schematically showing a holding sealing material of a second embodiment of the present invention when the holding sealing material is rolled around the periphery of a member to be wrapped and immediately before projected and recessed portions fit to each other.

FIG. 6 is a cross-sectional view perpendicular to the longitudinal direction schematically showing the holding sealing material of the present embodiment when the holding sealing material is rolled around the periphery of a member to be wrapped and immediately before the projected and recessed portions fit to each other, as in the case of FIG. 2B.

As shown in FIG. 6, in the holding sealing material 20 of the present embodiment, the projected portion 23a of the mat 21 has a shape of a quadrangle in the cross-sectional view perpendicular to the longitudinal direction, and the quadrangle is cut at two corner portions on the side of the member to be wrapped. Thus, the chamfers 230a and 230b are formed.

The chamfers of the present embodiment tend to be formed by cut out of a substantially triangular prism from the projected portion 23a at the two corner portions on the side of the member to be wrapped.

In this case, the corner portions are made smooth. Thus, the projected and recessed portions tend to smoothly fit to each other and overlapping of the fitting portions of the mat tends to be prevented even though slight displacement occurs due to deformation of the mat when the mat 21 is rolled around the periphery of a member to be wrapped. As a result, the holding sealing material tends to prevent leakage of exhaust gas in the case that it is used for the exhaust gas treating unit.

In this case, the relationship (d1/D1) between d1 (the distance between the intersection point of the cut line 230a (230b) with the short side and the end point of the short side closer to a member to be wrapped) and D1 (the length of the short side) at each of the chamfers 230a and 230b is in the same range as that in the first embodiment of the present invention. The two angles α each are also in the same range as that in the first embodiment of the present invention.

The method for rolling the holding sealing material of the second embodiment around a member to be wrapped is also the same as that in the first embodiment of the present invention.

In addition to the above effects, the present embodiment tends to achieve substantially the same effects (2) to (6) mentioned in the first embodiment of the present invention.

Third Embodiment

The following will describe the holding sealing material, the method for rolling the holding sealing material around a member to be wrapped, and the exhaust gas purifying apparatus according to a third embodiment of the present invention referring to the drawings.

The present embodiment shows the holding sealing material similar to that of the first embodiment of the present invention except for the shape of the projected portion of the mat. Specific description of the structure is omitted herein except for the shape of the projected portion of the mat because the structure other than the shape of the projected portion is the same as that of the first embodiment of the present invention.

Figure 7:
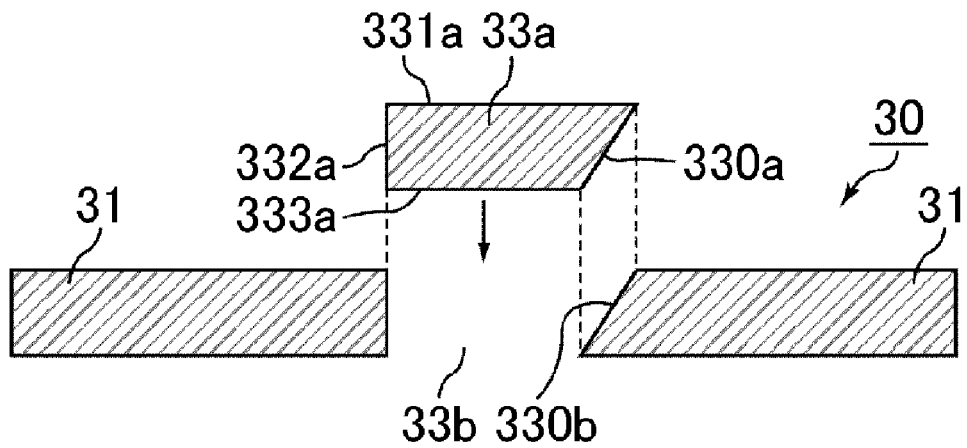
FIG. 7 is a cross-sectional view perpendicular to the longitudinal direction schematically showing a holding sealing material of a third embodiment of the present invention when the holding sealing material is rolled around the periphery of a member to be wrapped and immediately before projected and recessed portions fit to each other.

FIG. 7 is a cross-sectional view perpendicular to the longitudinal direction schematically showing the holding sealing material of the present embodiment when the holding sealing material is rolled around the periphery of a member to be wrapped and immediately before the projected and recessed portions fit to each other.

As shown in FIG. 7, in the holding sealing material 30 of the present embodiment, the projected portion 33a of the mat 31 is a trapezoid in which the side 333a closest to the member to be wrapped (the upper base) is shorter than the opposite side 331a (the lower base), and the recessed portion 33b has a shape such that the recessed portion 33b fits to the projected portion 33a in the cross-sectional view perpendicular to the longitudinal direction. In the cross-sectional view of the projected portion 33a, the side 330a, which belongs to the side face, is not perpendicular but inclined to the side 333a and the side 331a, while the side 332a is perpendicular to the side 333a and the side 331a.

As is mentioned in the first embodiment of the present invention, d1/D1 is preferably 0.1 to 0.6 in the case that the chamfer 130a is formed. If d1/D1 is 0.6 or smaller, the volume of the removed portion tends not to be too large and the mat is less likely to have a lower holding power. In order to avoid such a problem, the recessed portion 33b is made to have a shape such that the projected portion 33a perfectly fits to the recessed portion 33b in the case that the projected portion 33a has the trapezoidal shape as shown in FIG. 7 in the cross-sectional view perpendicular to the longitudinal direction. Thus, no space is formed when the projected portion 33a fits to the recessed portion 33b, as is different from the case of the mat 11 shown in FIG. 2B.

In the present embodiment, the side 330b, which belongs to the inner side face of the recessed portion 33b, is made inclined. In this case, the side 330a (the lower face in the figure) of the projected portion 33a presumably has no portion to be an obstacle during the fitting to the recessed portion 33b. Thus, in comparison with the aforementioned embodiments, the projected portion 33a tends to more smoothly fit to the recessed portion 33b and overlapping of the fitting portions of the mat tends to be prevented even though slight displacement occurs due to deformation of the mat 31 when the mat 31 is rolled around the periphery of a member to be wrapped. As a result, the holding sealing material tends to prevent leakage of exhaust gas in the case that it is used for the exhaust gas treating unit.

The holding sealing material of the present embodiment tends to be formed by cut out of the projected portion 33a into a substantially trapezoidal shape in the cross-sectional view.

In addition to the above effects, the present embodiment tends to achieve substantially the same effects (4) to (6) mentioned in the first embodiment of the present invention.

Fourth Embodiment

The following will describe the holding sealing material, the method for rolling the holding sealing material around a member to be wrapped, and the exhaust gas purifying apparatus according to a fourth embodiment of the present invention referring to the drawings.

The present embodiment shows the holding sealing material similar to that of the first embodiment of the present invention except for the shape of the projected portion of the mat. Specific description of the structure is omitted herein except for the shape of the projected portion of the mat because the structure other than the shape of the projected portion is the same as that of the first embodiment of the present invention.

Figure 8:
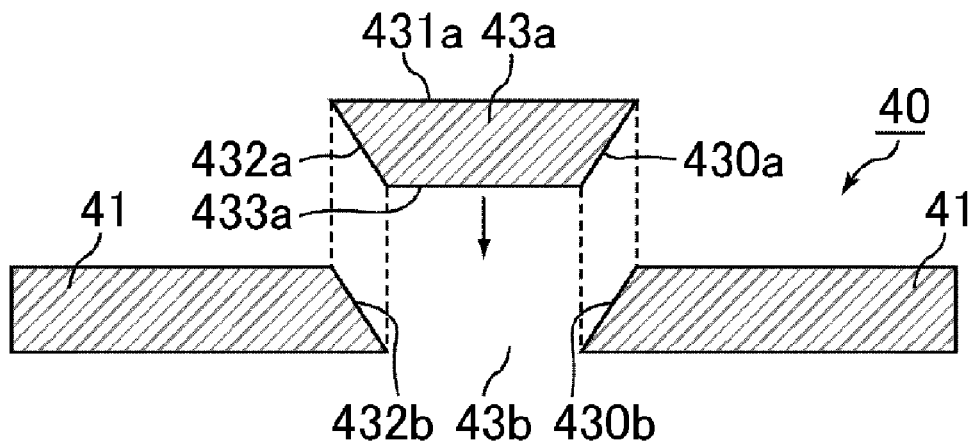
FIG. 8 is a cross-sectional view perpendicular to the longitudinal direction schematically showing a holding sealing material of a fourth embodiment of the present invention when the holding sealing material is rolled around the periphery of a member to be wrapped and immediately before projected and recessed portions fit to each other.

FIG. 8 is a cross-sectional view perpendicular to the longitudinal direction schematically showing the holding sealing material of the present embodiment when the holding sealing material is rolled around the periphery of a member to be wrapped and immediately before the projected and recessed portions fit to each other.

As shown in FIG. 8, in the holding sealing material 40 of the present embodiment, the projected portion 43a of the mat 41 is a trapezoid in which the side 433a closest to the member to be wrapped (the upper base) is shorter than the opposite side 431a (the lower base), and the recessed portion 43b has a shape such that the recessed portion 43b fits to the projected portion 43a in the cross-sectional view perpendicular to the longitudinal direction. In the cross-sectional view of the projected portion 43a of the mat 41, the sides 430a and 432a, each of which belongs to the side faces, are not perpendicular but inclined to the side 433a and the side 331a, as is different from the case of the third embodiment of the present invention.

Also in the present embodiment, the recessed portion 43b of the mat 41 is made to have a shape such that the projected portion 43a perfectly fits to the recessed portion 43b. Thus, no space is formed when the projected portion 43a fits to the recessed portion 43b, as is different from the case of the mat 11 shown in FIG. 2B.

In the present embodiment, the sides 430b and 432b, each of which belongs to the inner side faces of the recessed portion 43b of the mat 41, are made inclined. In this case, the sides 430a and 432a of the projected portion 43a have no portion to be an obstacle during the fitting to the recessed portion 43b. Thus, in comparison with the aforementioned embodiments, the projected portion 43a tends to more smoothly fit to the recessed portion 43b and overlapping of the fitting portions of the mat tends to be prevented even though slight displacement occurs due to deformation of the mat 41 when the mat 41 is rolled around the periphery of a member to be wrapped. Thus, the holding sealing material tends to prevent leakage of exhaust gas in the case that it is used for the exhaust gas treating unit.

The holding sealing material of the present embodiment is formed by cut out of the projected portion 43a of the mat 41 into a trapezoidal shape in the cross-sectional view.

In addition to the above effects, the present embodiment tends to achieve almost the same effects (4) to (6) mentioned in the first embodiment of the present invention.

Fifth Embodiment

The following will describe the holding sealing material, the method for rolling the holding sealing material around a member to be wrapped, and the exhaust gas purifying apparatus according to a fifth embodiment of the present invention referring to the drawings.

The present embodiment shows the holding sealing material similar to that of the first embodiment of the present invention except for the shape of the recessed portion of the mat. Specific description of the structure is omitted herein except for the shape of the recessed portion of the mat because the structure other than the shape of the recessed portion is the same as that of the first embodiment of the present invention.

Figure 9A:
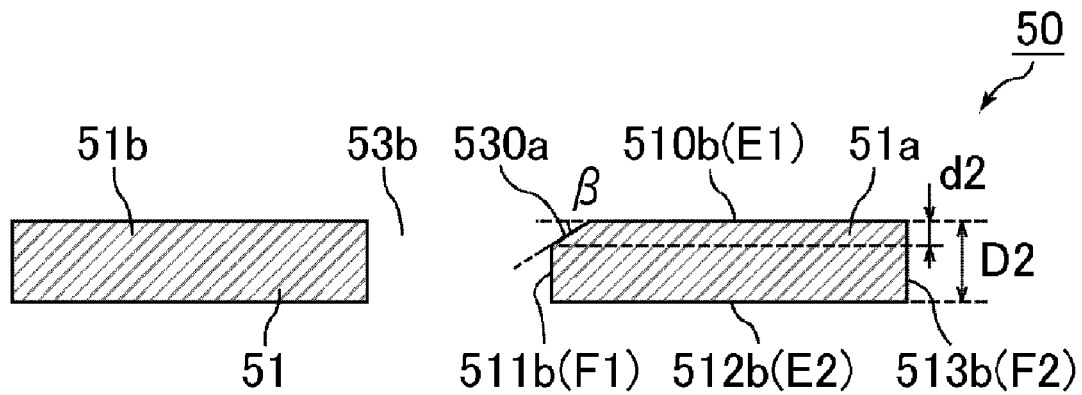
FIG. 9A is a cross-sectional view perpendicular to the longitudinal direction showing a recessed portion of a mat of a fifth embodiment of the present invention.
Figure 9B:
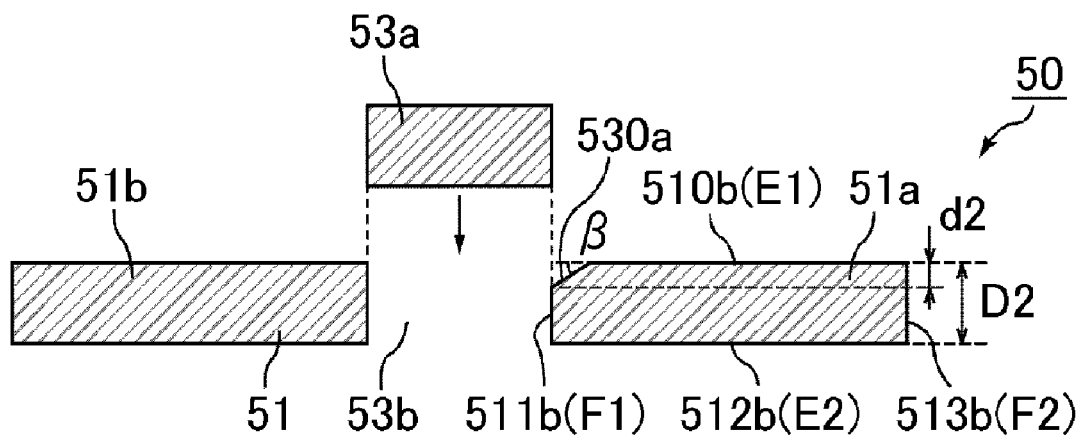
FIG. 9B is a cross-sectional view perpendicular to the longitudinal direction schematically showing a holding sealing material of the fifth embodiment of the present invention when the holding sealing material is rolled around the periphery of a member to be wrapped and immediately before a projected portion and the recessed portion fit to each other.

FIG. 9A is a cross-sectional view perpendicular to the longitudinal direction showing a recessed portion of a mat of the present embodiment; and FIG. 9B is a cross-sectional view perpendicular to the longitudinal direction schematically showing the holding sealing material of the present embodiment when the holding sealing material is rolled around the periphery of a member to be wrapped and immediately before the projected and recessed portions fit to each other. The cross-sectional view shown in FIG. 9A corresponds to the C-C line cross-sectional view of the mat 11 shown in FIG. 1A.

As shown in FIG. 9A, in the holding sealing material 50 of the present embodiment, the recessed portion 53b (the gap) is disposed between two quadrangles 51a and 51b in the cross-sectional view perpendicular to the longitudinal direction. The holding sealing material 50 has a characteristic feature in the quadrangle 51a. That is, the quadrangle 51a is cut at a corner portion closer to the gap (recessed region 53b) on the side opposite to the member to be wrapped, and thus has a chamfer 530a. In other words, the chamfer 530a is formed by cut out of the corner portion of the mat 51 which is on the right side in the figure of the recessed region 53b (gap) and is to be first in contact with the projected portion 53a. In this case, the corner portion is made smooth. Thus, the projected portion 53a and the recessed portion 53b tend to smoothly fit to each other and overlapping of the fitting portions of the mat tends to be prevented when the mat is rolled around the periphery of a member to be wrapped. As a result, the holding sealing material tends to prevent leakage of exhaust gas in the case that it is used for the exhaust gas treating unit such as a catalyst supporting carrier and an exhaust gas filter.

The holding sealing material preferably satisfies d2/D2=0.1 to 0.6 wherein, assuming that the long sides substantially parallel to the surface of the member to be wrapped are Long sides E1 (510b) and E2 (512b) and the short sides substantially perpendicular to Long sides E1 and E2 are Short sides F1 (511b) and F2 (513b) in one of the uncut quadrangles of the recessed portion 53b in the cross-sectional view as shown in FIG. 9A, d2 represents the distance between the intersection point of the cut line with Short side F1 (511b) and the end point of Short side F closer to the member to be wrapped, and D2 represents the length of Short side F. In the case of d2/D2=0.1 to 0.6, the volume of the removed portion tends not to be too large. In this case, the repulsive force tends not to be low at the chamfer of the mat when the mat is rolled around a member to be wrapped. Thus, the power for holding the wrapped member tends not to be reduced and leakage of exhaust gas tends to be securely prevented.

If d2/D2 is 0.6 or smaller, the volume of the removed portion tends not to be too large and the repulsive force of the mat is less likely to be reduced when the mat is rolled around a member to be wrapped. Thus, the power for holding the wrapped member tends not to be reduced and leakage of exhaust gas is less likely to occur. If d2/D2 is 0.1 or greater, the volume of the removed portion tends not to be small. Thus, the projected portion 53a tends to appropriately fit to the recessed portion 53b in the mat 51. Here, d2/D2 is more preferably 0.2 to 0.5.

The angle β formed by the extension line of Long side E1 (510b) and the cut line of the chamfer is preferably 25° to 80°. An angle β of 25° to 80° is an appropriately adjusted angle. Thus, the projected portion 53a tends to smoothly fit to the recessed portion 53b.

If the angle β is 25° or greater, the cut line tends to form a sufficient angle with the side E1. Thus, the projected portion 53a tends to appropriately fit to the recessed portion 53b. If the angle β is 80° or smaller, the cut line tends to form an appropriate angle with the side F1. Thus, the projected portion 53a also tends to appropriately fit to the recessed portion 53b.

The angle β is more preferably 25° to 60°.

The following will list the effects of the holding sealing material, the method for rolling the holding sealing material around a member to be wrapped, and the exhaust gas purifying apparatus of the present embodiment.

(1) In the holding sealing material of the present embodiment, the recessed portion (the gap) is disposed between two quadrangles in the cross-sectional view perpendicular to the longitudinal direction. The holding sealing material has a characteristic feature in one of the quadrangles. That is, one of the quadrangles is cut at a corner portion closer to the gap on the side opposite to the member to be wrapped, and thus a chamfer is formed. In other words, the chamfer is formed by cut out of the corner portion which is of the recessed region (gap) and which is to be first in contact with the projected portion. In this case, the corner portion is made smooth. Thus, the projected and recessed portions tend to smoothly fit to each other and overlapping of the fitting portions of the mat tends to be prevented when the mat is rolled around the periphery of a member to be wrapped. As a result, the holding sealing material tends to prevent leakage of exhaust gas in the case that it is used for the exhaust gas treating unit such as a catalyst supporting carrier and an exhaust gas filter.

(2) The holding sealing material of the present embodiment satisfies d2/D2=0.1 to 0.6 wherein, assuming that the long sides substantially parallel to the surface of the member to be wrapped are Long sides E1 and E2 and the short sides substantially perpendicular to Long sides E1 and E2 are Short sides F1 and F2 in one of the uncut quadrangle adjacent to the recessed portion 53b in the cross-sectional view as shown in FIG. 9A, d2 represents the distance between the intersection point of the cut line with Short side F1 and the end point of Short side F closer to a member to be wrapped, and D2 represents the length of Short side F. In this case, the volume of the removed portion is less likely to be too large, and the repulsive force tends not to be low at the chamfer of the mat when the mat is rolled around a member to be wrapped. Thus, the power for holding the wrapped member tends not to be reduced and leakage of exhaust gas tends to be securely prevented.

(3) In the holding sealing material of the present embodiment, the angle β formed by the extension line of Long side E1 (510b) and the cut line of the chamfer is 25° to 80°. In this case, the corner portion is made smooth. Thus, the projected and recessed portions tend to smoothly fit to each other and overlapping of the fitting portions of the mat tends to be prevented even though slight displacement occurs due to deformation of the mat when a single mat is rolled around the periphery of a member to be wrapped or slight displacement occurs between the mats in the width direction when multiple mats are rolled around the periphery of a member to be wrapped. As a result, the holding sealing material tends to prevent leakage of exhaust gas in the case that it is used for the exhaust gas treating unit.

(4) In the holding sealing material of the present embodiment, the mat is needle-punched. Thus, the mat is less likely to be separated and tends to maintain a predetermined shape. In the case that the mat is needle-punched in the width direction perpendicular to the longitudinal direction, the mat has creases along the needle-punched portions in the width direction. Thus, the holding sealing material is easily rolled around the periphery of a member to be wrapped.

(5) In the holding sealing material of the present embodiment, the inorganic fibrous material includes an alumina-silica complex. Thus, the holding sealing material is excellent in properties such as heat resistance and elasticity, and in performance for holding the wrapped member.

(6) In the method for rolling the holding sealing material around the periphery of a member to be wrapped of the present embodiment, the side having the recessed portion is first brought close to the member to be wrapped and then the projected portion is allowed to fit to the recessed portion when the holding sealing material is rolled around the periphery of the member to be wrapped. Thereby, the holding sealing material tends to be favorably rolled around the periphery of a member to be wrapped, and the projected portion tends to be allowed to smoothly fit to the recessed portion.

Sixth Embodiment

The following will describe the holding sealing material, the method for rolling the holding sealing material around a member to be wrapped, and the exhaust gas purifying apparatus according to a sixth embodiment of the present invention referring to the drawings.

The present embodiment shows the holding sealing material similar to that of the first embodiment of the present invention except for the shape of the recessed portion of the mat. Specific description of the structure is omitted herein except for the shape of the recessed portion of the mat because the structure other than the shape of the recessed portion is the same as that of the first embodiment.

Figure 10:
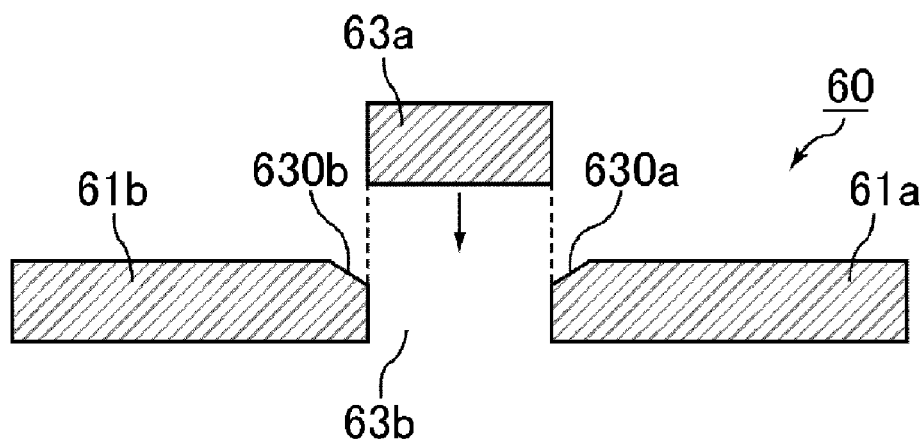
FIG. 10 is a cross-sectional view perpendicular to the longitudinal direction schematically showing a holding sealing material of a sixth embodiment of the present invention when the holding sealing material is rolled around the periphery of a member to be wrapped and immediately before projected and recessed portions fit to each other.

FIG. 10 is a cross-sectional view perpendicular to the longitudinal direction schematically showing the holding sealing material of the present embodiment when the holding sealing material is rolled around the periphery of a member to be wrapped and immediately before the projected and recessed portions fit to each other.

As shown in FIG. 10, the holding sealing material 60 of the present embodiment is different from the holding sealing material 50 shown in FIGS. 9A and 9B in that the quadrangles adjacent to the recessed region 63b (the gap) have chambers 630a and 630b each having the same structure as that of the chamfer 530a shown in FIG. 9B. In this case, the corner portions are made smooth. Thus, the projected portion 63a and the recessed portion 63b tend to smoothly fit to each other and overlapping of the fitting portions of the mat tends to be prevented. As a result, the holding sealing material tends to prevent leakage of exhaust gas in the case that it is used for the exhaust gas treating unit such as a catalyst supporting carrier and an exhaust gas filter.

In the holding sealing materials 50 and 60 of the fifth and sixth embodiments of the present invention, respectively, the chamfers each may have a straight line (45-degrees chamfer) or may have a curved line (round chamfer) as in the case of the holding sealing material of the first embodiment of the present invention.

In this case, the relationship (d2/D2) between the length d2 shown in FIG. 9A and the length D2 of the short side is in the same range as that in the fifth embodiment of the present invention. The two angles β each are in the same range as that in the fifth embodiment of the present invention.

In addition to the above effects, the present embodiment achieves substantially the same effects (2) to (6) mentioned in the fifth embodiment of the present invention.

Seventh Embodiment

The following will describe the holding sealing material, the method for rolling the holding sealing material around a member to be wrapped, and the exhaust gas purifying apparatus according to a seventh embodiment of the present invention referring to the drawings.

The present embodiment shows the holding sealing material similar to that of the first embodiment of the present invention except for the shapes of the projected and recessed portions of the mat. Specific description of the structure is omitted herein except for the shapes of the projected and recessed portions of the mat because the structure other than the shapes of the projected and recessed portions is the same as that of the first embodiment.

Figure 11:
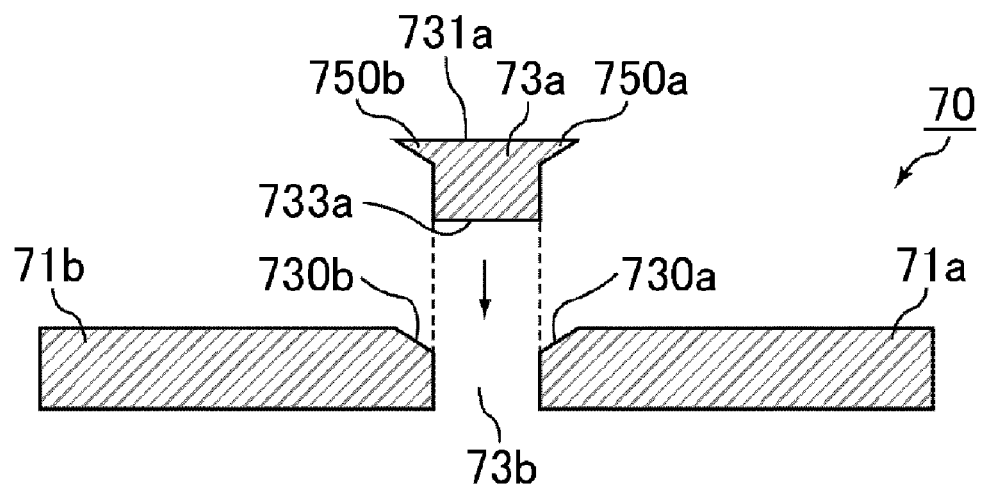
FIG. 11 is a cross-sectional view perpendicular to the longitudinal direction schematically showing a holding sealing material of a seventh embodiment of the present invention when the holding sealing material is rolled around the periphery of a member to be wrapped and immediately before projected and recessed portions fit to each other.

FIG. 11 is a cross-sectional view perpendicular to the longitudinal direction schematically showing the holding sealing material of the present embodiment when the holding sealing material is rolled around the periphery of a member to be wrapped and immediately before the projected and recessed portions fit to each other.

The holding sealing material 50 shown in FIGS. 9A and 9B has the chamfer 530a, and the holding sealing material 60 shown in FIG. 10 has the chamfers 630a and 630b. Thus, fitting is smoothly achieved; however, the portion where the mat has been partially removed after the fitting becomes a gap, and the mat presumably has a slightly inferior contact pressure at the removed portion of the mat.

In contrast, in the holding sealing material 70 of the present embodiment, protruding portions 750a and 750b are formed on the projected portion 73a of the mat 71 so as to fill the gap where the chamfers 730a and 730b are formed on the mat 71. Thus, the projected portion 73a tightly fits to the recessed portion 73b.

In the holding sealing material 70 of the present embodiment, the two chamfers 730a and 730b are formed on both quadrangles adjacent to the recessed portion 73b. In this case, the corner portion is made smooth. Thus, the projected portion 73a and the recessed portion 73b tend to smoothly fit to each other and overlapping of the fitting portions of the mat tends to be prevented. As a result, the holding sealing material tends to prevent leakage of exhaust gas in the case that it is used for the exhaust gas treating unit such as a catalyst supporting carrier and an exhaust gas filter. In addition, no gap tends to be formed. Thus, the contact pressure to a member to be wrapped tends not to be reduced.

The following will list the effects of the holding sealing material, the method for rolling the holding sealing material around the periphery of a member to be wrapped, and the exhaust gas purifying apparatus of the present embodiment.

(1) In the holding sealing material of the present embodiment, the recessed portion (the gap) is disposed between two quadrangles in the cross-sectional view perpendicular to the longitudinal direction. The holding sealing material has a characteristic feature in one of the quadrangles and the projected portion. That is, one of the quadrangles is cut at a corner portion closer to the gap on the side opposite to the member to be wrapped, and thus a chamfer is formed. The projected portion has the protruding portion such that the protruding portion perfectly fits to the chamfer. In this case, the corner portion is made smooth. Thus, the projected and recessed portions tend to smoothly fit to each other and overlapping of the fitting portions of the mat tends to be prevented when the mat is rolled around the periphery of a member to be wrapped. Thus, the holding sealing material tends to prevent leakage of exhaust gas in the case that it is used for the exhaust gas treating unit such as a catalyst supporting carrier and an exhaust gas filter.

(2) In the holding sealing material of the present embodiment, the mat is needle-punched. Thus, the mat is less likely to be separated and tends to maintain a predetermined shape.

In the case that the mat is needle-punched in the width direction perpendicular to the longitudinal direction, the mat has creases along the needle-punched portions in the width direction. Thus, the holding sealing material is easily rolled around the periphery of a member to be wrapped.

(3) In the holding sealing material of the present embodiment, the inorganic fibrous material includes an alumina-silica complex. Thus, the holding sealing material is excellent in properties such as heat resistance and elasticity, and in performance for holding a member to be wrapped.

(4) In the method for rolling the holding sealing material around the periphery of a member to be wrapped of the present embodiment, the side having the recessed portion is first brought close to the member to be wrapped and then the projected portion is allowed to fit to the recessed portion when the holding sealing material is rolled around the periphery of the member to be wrapped. Thereby, the holding sealing material tends to be favorably rolled around the periphery of a member to be wrapped, and the projected portion tends to be allowed to smoothly fit to the recessed portion.

Eighth Embodiment

The following will describe the holding sealing material, the method for rolling the holding sealing material around a member to be wrapped, and the exhaust gas purifying apparatus according to an eighth embodiment of the present invention referring to the drawings.

The present embodiment shows the mat similar to the mat 41 of the fourth embodiment of the present invention shown in FIG. 8. The mat of the present embodiment is different from the mat 41 of the fourth embodiment of the present invention in that the fitting regions of the projected and recessed portions are covered with a combustible film. Specific description of the structure is omitted herein except for the above structures because the structure other than the above structure is the same as that of the fourth embodiment.

Figure 12:
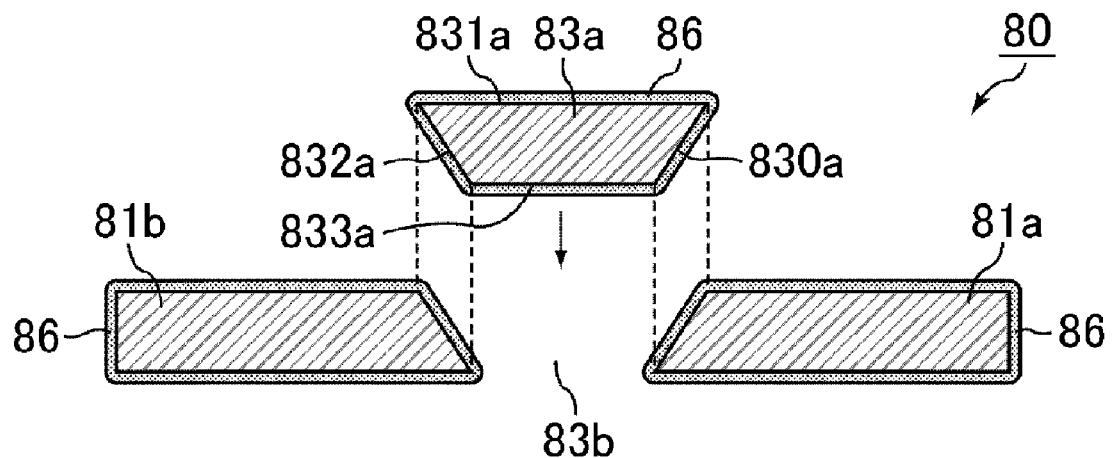
FIG. 12 is a cross-sectional view perpendicular to the longitudinal direction schematically showing a holding sealing material of a eighth embodiment of the present invention when the holding sealing material is rolled around the periphery of a member to be wrapped and immediately before projected and recessed portions fit to each other.

FIG. 12 is a cross-sectional view perpendicular to the longitudinal direction schematically showing the holding sealing material of the present embodiment when the holding sealing material is rolled around the periphery of a member to be wrapped and immediately before the projected and recessed portions fit to each other.

As shown in FIG. 12, in the holding sealing material 80 of the present embodiment, the projected portion 83a of the mat has a substantially trapezoidal shape, and the recessed portion 83b has a shape such that the recessed portion 83b fits to the projected portion 83a in the cross-sectional view perpendicular to the longitudinal direction. In the cross-sectional view of the projected portion 83a, the sides 830a and 832a, each of which belongs to the side faces, are not perpendicular but inclined to the side 833a and the side 831a.

In addition, the fitting regions of the projected portion 83a and the recessed portion 83b are covered with a combustible film 86.

The fitting surface is made smoother than the case that the fibers are exposed on the surface. Thus, in addition to the effects of the holding sealing material 40 of the fourth embodiment of the present invention shown in FIG. 8, the projected and recessed portions tend to smoothly fit to each other.

In order to achieve the above effect, the combustible film 86 may cover only the fitting regions of the projected portion 83a of the mat 81, or may cover only the fitting regions of the recessed portion 83b of the mat 81. Alternatively, the combustible film 86 may cover the whole mat 81.

The combustible film is preferably made of paper or a plastic film. In order to achieve close contact, the plastic film is more preferable. Examples of the paper include tissue papers and kraft papers. Examples of the plastic film include nylon films, polyethylene films, and polyethylene terephthalate films.

The thickness of the combustible film is preferably 20 to 200 μm. If the thickness of the combustible film is 20 μm or greater, the film is not so thin that the film tends not to be broken when the holding sealing material is rolled around the periphery of a member to be wrapped. If the thickness of the combustible film is 200 μm or smaller, the film is not so thick that the flexibility of the film tends not to be reduced and the workability of the holding sealing material tends not to be reduced when the holding sealing material is rolled around a member to be wrapped.

In the case that the whole mat 81 is covered with the combustible film 86, the mat 81 tends to maintain its shape without a binding material owing to the combustible film 86.

Such a holding sealing material 80 may be produced as follows: preparing a bag-shaped combustible film 86 which is capable of enclosing the whole mat 81; putting the mat 81 in the combustible film; disposing a device such as a vacuum pump at the open end and compulsory discharging the air inside the bag-shaped combustible film 86 with the device; and thus enclosing the mat 81 under reduced pressure. The combustible film 86 tends to be sealed by heat-fusion at the circumference of the combustible film 86.

The thickness of the compressed mat 81 is adjusted depending on the degree of the pressure reduction.

As mentioned above, the holding sealing material 80 enclosed with the combustible film 86 is rolled around the exhaust gas treating unit and disposed between the exhaust gas treating unit and the casing, for example. The holding sealing material 80 is in a compressed state as mentioned above, and thus is easily disposed in the casing. When the film disposed in the casing is partially opened or the film is decomposed to disappear due to heat generated when the holding sealing material is used in a filter, the compressed mat expands and the holding sealing material 80 is closely held between the exhaust gas treating unit and the casing.

In addition to the above effects, the present embodiment achieves substantially the same effects (4) to (6) mentioned in the first embodiment of the present invention.

Ninth Embodiment

The following will describe the holding sealing material, the method for rolling the holding sealing material around a member to be wrapped, and the exhaust gas purifying apparatus according to a ninth embodiment of the present invention referring to the drawings.

Figure 13:
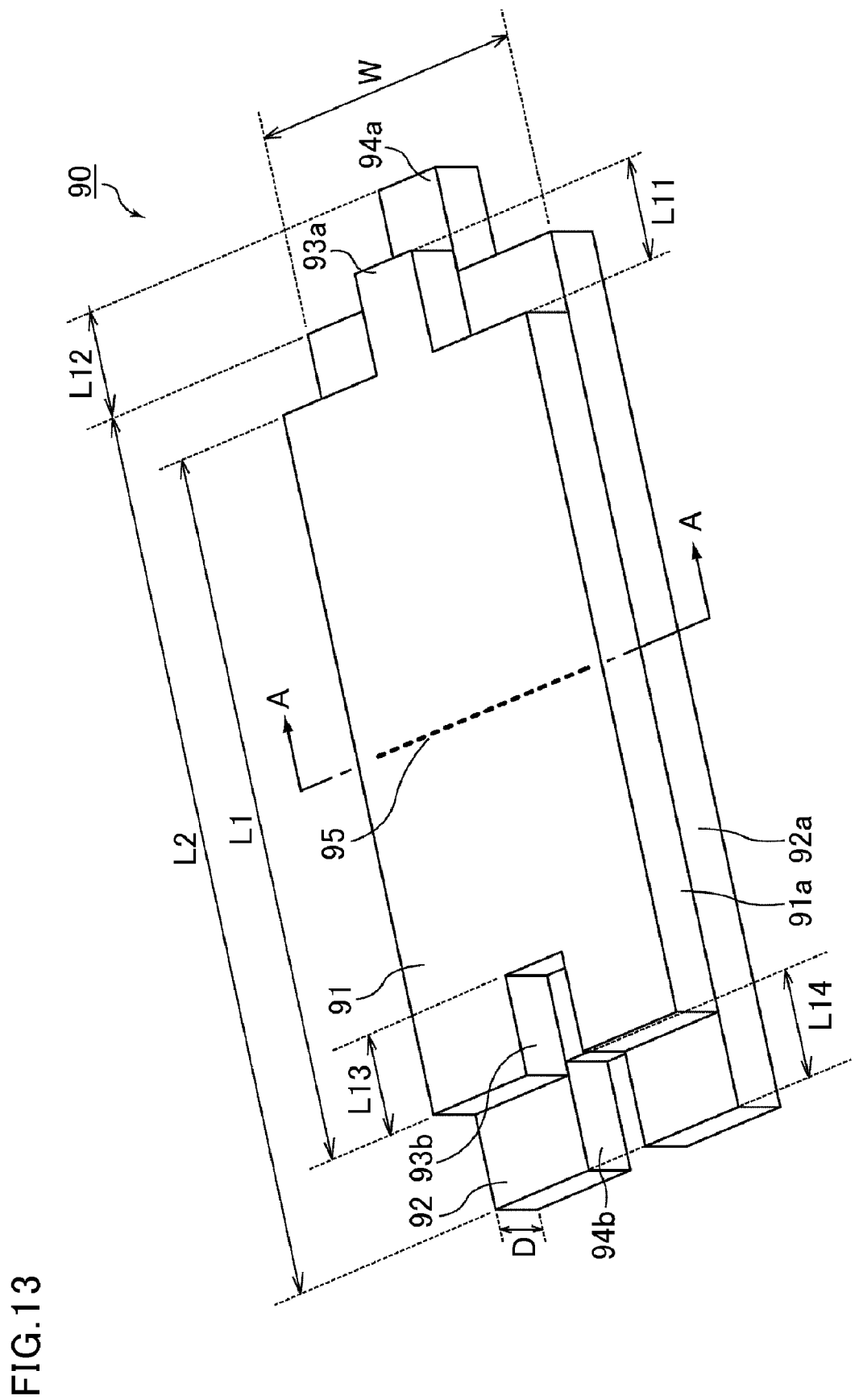
FIG. 13 is a perspective view schematically showing a holding sealing material of a ninth embodiment of the present invention.

FIG. 13 is a perspective view schematically showing the holding sealing material of the ninth embodiment of the present invention.

In the first to eighth embodiments, the holding sealing materials 10 to 80 each include a single mat. The present embodiment is different from the first to eighth embodiments of the present invention in that the holding sealing material 90 includes multiple mats. The other structures are the same as those in the holding sealing material of the first embodiment of the present invention. Thus, the following will describe only the structure different from the first embodiment of the present invention, that is, the case that the holding sealing material includes two mats.

As shown in FIG. 13, the holding sealing material 90 of the present embodiment includes a laminate of mats 91 and 92 each having a quadrangular shape consisting of long sides extending in the longitudinal direction and short sides substantially perpendicular to the long sides in the plan view.

The lengths of the long sides (hereinafter, also referred to simply as the lengths) of the mats 91 and 92 are indicated by the arrows L1 and L2 in FIG. 13, respectively. The lengths of the short sides (hereinafter, also referred to as the widths) thereof are indicated by the arrow W in FIG. 13. The thicknesses thereof are indicated by the arrow D. The mat 91 and the mat 92 have different lengths L1 and L2, but have the same width W and thickness D.

On the mat 91, a projected portion 93a is formed on one of the short sides (hereinafter, also referred to as the ends), and a recessed portion 93b is formed on the other of the short sides; while a projected portion 94a and a recessed portion 94b are formed on the ends of the mat 92.

In the holding sealing material 90 shown in FIG. 13, the two mats 91 and 92 each having the thickness D of 1.5 to 15 mm are laminated. The number of mats to be laminated is not particularly limited, and three or more mats may be laminated.

The mat having the shortest length (hereinafter, also referred to as the shortest mat) among the mats is rolled around the periphery of a member to be wrapped. Another mat longer than the shortest mat is laminated on the shortest mat, and thereafter mats are laminated one by one. A mat further from the member to be wrapped is longer than a mat closer to the member to be wrapped. The mat furthest from the member to be wrapped is the mat having the longest length (hereinafter, also referred to as the longest mat) among the mats.

In the case of the holding sealing material 90 including the two mats 91 and 92 as shown in FIG. 13, the mat 91 is the shortest mat and the mat 92 is the longest mat.

The length L1 of the mat 91, the shortest mat, is such that the projected portion 93a and the recessed portion 93b formed on the ends just fit to each other when the holding sealing material is rolled around a member to be wrapped. In other words, the length L1 of the shortest mat corresponds to the perimeter of the member to be wrapped.

The length of the mat is determined without consideration of the dimensions of the projected and recessed portions formed on the ends of the mat.

In the holding sealing material 90 of the present embodiment, the projected portions 93a and 94a and the recessed portions 93b and 94b of the mat 91 and 92 each have the same shape as mentioned in any of the first to eighth embodiments (FIGS. 2A and 2B, and FIGS. 6, 7, 8, 9A, 9B, 10, 11, and 12).

In this case, the projected portion tends to smoothly fit to the recessed portion and overlapping of the fitting portions of the mat tends to be prevented even though slight displacement occurs between the mats in the width direction when multiple mats are rolled around the periphery of a member to be wrapped. Thus, the holding sealing material tends to prevent leakage of exhaust gas when it is rolled around the periphery of the exhaust gas treating unit such as a catalyst supporting carrier and an exhaust gas filter.

The laminated mats are fixed to each other by a fixing portion extending in the width direction perpendicular to the longitudinal direction of the mats. As shown in FIG. 13, the laminated mats 91 and 92 are fixed to each other by one fixing portion 95 in the holding sealing material 90 of the present embodiment. The fixing portion 95 is formed by machine-sewing. This fixing portion firmly fixes the two mats 91 and 92.

As shown in FIG. 13, the fixing portion 95 is separated from the long side faces 91a and 92a by a predetermined distance, and continuously extends in the width direction occupying 50% to 99.5% of the width of the mats 91 and 92.

The ends of the fixing portion 95 are preferably separated from the long side faces of the mats 91 and 92; however, each end of the fixing portion 95 may be in contact with each of the long side faces 91a and 92a of the mats 91 and 92 as long as the product is used without problems.

The following will describe the method for rolling the aforementioned holding sealing material 90 of the present embodiment around a member to be wrapped.

The holding sealing material of the present embodiment is rolled around the periphery of a member to be wrapped in the same manner as in the first to eighth embodiments of the present invention; that is, the side having the recessed portion of the mat is first brought close to the member to be wrapped, and then the projected portion of the mat is allowed to fit to the recessed portion. Referring to FIGS. 14A and 14B, the following will describe the fitting state of the recessed and projected portions when the holding sealing material is rolled around the periphery of a member to be wrapped by the above method.

FIG. 14A is a perspective view schematically showing the state when the holding sealing material of the present embodiment is rolled around the periphery of an exhaust gas treating unit and immediately before the projected and recessed portions fit to each other; and FIG. 14B is a cross-sectional view perpendicular to the longitudinal direction schematically showing the holding sealing material of the present embodiment when the holding sealing material is rolled around the periphery of the exhaust gas treating unit and immediately before the projected and recessed portions fit to each other.

As shown in FIGS. 14A and 14B, the side having the recessed portion 93b of the mat 91 and the side having the recessed portion 94b of the mat 92 are brought close to an exhaust gas treating unit 200 such that the mat 91, which is the shortest mat, is closest to the exhaust gas treating unit 200. Then, the projected portions 93a and 94a are inserted into the recessed portions 93b and 94b, respectively.

In this case, the projected portions 93a and 94a each have a trapezoidal shape. The recessed portions 93b and 94b each have a shape such that they are allowed to fit to the projected portions 93a and 94a, respectively. The projected portion 93a is smaller than the projected portion 94a, and is capable of passing through the recessed portion 94b. Thus, the projected portions 93a and 94a tend to smoothly fit to the recessed portions 93b and 94b, respectively, and overlapping of the fitting portions of each mat tends to be prevented. As a result, the holding sealing material tends to prevent leakage of exhaust gas when it is used in the exhaust gas purifying apparatus.

The mats 91 and 92 may be separately rolled around the exhaust gas treating unit 200, but it is efficient to simultaneously roll the two mats around the exhaust gas treating unit 200.

Thereafter, the exhaust gas treating unit 200 wrapped with the holding sealing material 90 including the mats 91 and 92 is stuffed into the casing 240, as shown in FIG. 14A.

In the description of the present embodiment, the projected portions 93a and 94a and the recessed portions 93b and 94b of the mats have the shapes shown in FIGS. 14A and 14B. The projected portions and the recessed portions of the mats may have any shape described in the first to eighth embodiments of the present invention, as mentioned above. Such a holding sealing material achieves the same effects achieved by the first to eighth embodiments of the present invention.

In the production of the holding sealing material of the present embodiment, the two mats 91 and 92, which are produced in the same manner as in the first embodiment of the present invention and each of which has a different length, may be fixed by a single fixing portion.

The length of the shortest mat to be rolled around the exhaust gas treating unit corresponds to the perimeter of the exhaust gas treating unit. Thus, the length of the shortest mat is determined depending on the perimeter of the exhaust gas treating unit. Then, the length of the mat disposed outside the shortest mat corresponds to the perimeter relative to the sum of the diameter of the exhaust gas treating unit and the thickness of the shortest mat rolled around the unit. Thus, the perimeter is first determined and next the length of the mat disposed outside the shortest mat is determined. This procedure is repeated, and thereby the length of each mat to be laminated is determined. The length of the mat is determined without consideration of the dimensions of the projected and recessed portions formed at the ends of the mat.

The mats thus produced are laminated in increasing or decreasing order of length. The number of mats to be laminated may be changed depending on target properties for the holding sealing material such as the holding power and the heat insulating properties. The mats may be laminated as follows. The longest mat is first placed, and then each of the mats is laminated thereon in decreasing order of length. A shorter mat to be laminated may be disposed within the length of the longer mat under the shorter mat, or may be disposed such that an end of the shorter mat is outside the corresponding end of the longer mat in the longitudinal direction.

Then, the laminated mats are fixed to each other. The mats are subjected to fixing treatment such as machine-sewing at one site. In the case of machine-sewing, the mats may be lockstitched at a stitch length of 10 mm and backstitched at the fixing end with Z-twisted reddish-purple sewing thread having a diameter of 1 mm. The machine-sewing is performed so that each of the fixing ends is separated by 10 mm from the long side faces of each mat and the length of the fixing portion is 270 mm.

In the case of forming the fixing portion by machine-sewing, the mats may be fixed after lamination of the mats. In contrast, in the case of fixing the mats with an adhesive, the mats may be fixed as follows: a mark is put on each mat at the position corresponding to the fixing portion (for example, a rod is placed parallel to the laminating direction at the position corresponding to the fixing portion on the side face of the mat); and the mats are laminated along the mark and fixed with an adhesive one by one.

In the present embodiment, the mats are fixed to each other by the fixing portion. In this case, displacement of the mats in the width direction does not occur when the holding sealing material is rolled around the exhaust gas treating unit, and the handleability of the holding sealing material is preferable. Thus, there is no need to worry about large displacement of the mats, resulting in improved efficiency for producing the exhaust gas purifying apparatus.

In the above description, the shapes of the projected and/or recessed portions of the two mats are the same as those mentioned in the first to eighth embodiments of the present invention; however, the present invention is not limited to this structure. In addition, three or more mats may be used. In the case of three or more mats, each projected portion may be designed such that the area thereof decreases from the longest mat to the shortest mat. Further, the projected and recessed portions of each of the mats of the holding sealing material each may have a shape mentioned in any one of the first to eighth embodiments of the present invention; for example, the shape of the projected portion may be different from one mat to another.

The following will list the effects of the holding sealing material, the method for rolling the holding sealing material around the periphery of a member to be wrapped, and the exhaust gas purifying apparatus of the present embodiment.

(1) In the holding sealing material of the present embodiment, the projected portions of multiple mats (for example, two mats) each have a trapezoidal shape. The recessed portions each have a shape such that they are allowed to fit to the projected portions. The projected portion is smaller than the recessed portion, and is capable of passing through the recessed portion. Thus, the projected portions tend to smoothly fit to the recessed portions, and overlapping of the fitting portions of the mats tends to be prevented. As a result, the holding sealing material tends to prevent leakage of exhaust gas when it is used in the exhaust gas purifying apparatus.

(2) In the holding sealing material of the present embodiment, the fixing portion for fixing the multiple mats extends in the width direction perpendicular to the longitudinal direction of the mats. In other words, the fixing portion is disposed in the direction perpendicular to the rolling direction of the holding sealing material around the exhaust gas treating unit. Thus, the fixing portion tends to prevent difficulty in rolling the holding sealing material caused by tensile stress which occurs especially at the periphery of a member to be wrapped, and tends to allow the holding sealing material to be well rolled. The fixing portion tends to further prevent curling up of the mats from the long sides and displacement of the mats, and tends to more securely prevent displacement of the mats.

(3) In the holding sealing material of the present embodiment, the fixing portion is separated from at least one long side face of the mat and does not extend in the whole width. Thus, fixing treatment on the long side faces is not required, and the holding sealing material tends to suppress local stress to prevent damages on the mats.

(4) In the holding sealing material of the present embodiment, the mat is needle-punched. Thus, the mat is less likely to be separated and tends to maintain a predetermined shape. In the case that the mat is needle-punched in the width direction perpendicular to the longitudinal direction, the mat has creases along the needle-punched portions in the width direction. Thus, the holding sealing material is easily rolled around the periphery of a member to be wrapped.

(5) In the holding sealing material of the present embodiment, the inorganic fibrous material includes an alumina-silica complex. Thus, the holding sealing material is excellent in properties such as heat resistance and elasticity, and in performance for holding a member to be wrapped.

(6) In the method for rolling the holding sealing material around the periphery of a member to be wrapped of the present embodiment, the side having the recessed portion is first brought close to the member to be wrapped and then the projected portion is allowed to fit to the recessed portion when the holding sealing material is rolled around the periphery of a member to be wrapped. Thereby, the holding sealing material tends to be favorably rolled around the periphery of a member to be wrapped.

(7) In the exhaust gas purifying apparatus of the present embodiment, the holding sealing material of the present embodiment is used. Thus, when rolled around the periphery of the exhaust gas treating unit, the holding sealing material tends to prevent tensile stress on the periphery of the unit and creases on the internal face. As a result, the whole exhaust gas purifying apparatus tends to prevent leakage of exhaust gas and is prevented from reduction in durability.

EXAMPLES

The following will describe examples which more specifically illustrate the first to ninth embodiments of the present invention. The embodiments of the present invention are not limited to the examples.

Example 1

The present example more specifically illustrates the holding sealing material of the first embodiment of the present invention, that is, the holding sealing material having the projected portion with the shape shown in FIGS. 1A, 1B, 2A, and 2B.

The holding sealing material is produced as follows.
(1) Fiber-Forming Step

A basic aqueous solution of aluminum chloride was prepared with an Al content of 70 g/l and Al:Cl=1:1.8 (atomic ratio). Silica sol was added to the basic aqueous solution of aluminum chloride so that the constitutional ratio in a fired inorganic fibrous material was $Al_2O_3:SiO_2=72:28$ (weight ratio). Further, an appropriate amount of an organic polymer (polyvinyl alcohol) was added thereto. Thus, a mixed solution was prepared.

The mixed solution obtained was concentrated, and the concentrated solution was used as a mixture for fiber forming. The mixture for fiber forming was processed by blowing to provide a precursor of the inorganic fibrous material having an average fiber diameter of 5.1 μm.
(2) Compressing Step The precursor of the inorganic fibrous material obtained in the step (1) was compressed to provide a continuous sheet.
(3) Needle-Punching Step The sheet obtained in the step (2) was continuously needle-punched as follows to provide a needle-punched material.

A needle board provided with needles at a density of 21 pcs/cm² was prepared. This needle board was placed above one surface of the sheet, and was moved down and up in the thickness direction of the sheet once to needle-punch the sheet. Thereby, the needle-punched material was produced. At that time, the needle was put through the sheet until the barb formed on the tip of each needle penetrated the opposite surface of the sheet.
(4) Firing Step The needle-punched material obtained in the step (3) was continuously fired with the highest temperature of 1250° C. to provide a fired sheet including an inorganic fibrous material of alumina and silica. The average fiber diameter of the inorganic fibrous material was 5.1 μm, and the smallest inorganic fiber diameter was 3.2 μm. The alumina fibrous material thus obtained had a balk density of 0.15 g/cm³ and an amount per unit area of 1400 g/m².
(5) Cutting Step The fired sheet obtained in the step (4) was cut to provide a cut sheet.
(6) Impregnating Step The cut sheet obtained in the step (5) was impregnated with an organic binder solution (acrylic latex) containing an acrylic resin as an organic binder by flow coating. Thereby, an impregnated sheet was produced.
(7) Drying Step An excessive organic binder solution was removed by suction from the impregnated sheet obtained in the step (6), and then the sheet was compressed and dried to be made thin. Thereby, a needle-punched mat having a thickness of 7.5 mm was produced.
(8) Finish-Cutting Step The needle-punched mat thus obtained was finish-cut to have the following shape: the length was 776 mm and the width was 290 mm in the plan view; a projected portion 13*a* was formed at one end with a length L11 of 400 mm and a width W11 of 100 mm; and a recessed portion 13*b* fitting to the projected portion 13*a* was formed on the other end.

Thereafter, a triangular prism was cut out from a corner portion of the projected portion 13*a* to provide a chamfer 130*a* (see FIG. 1B). Thereby, a mat 11 was produced. In this case, the mat 11 satisfied d1/D1=0.4 and an angle α=45°.

Example 2

In the present example, a mat 21 was produced in the same manner as in Example 1 so as to be the holding sealing material more specifically illustrating the second embodiment of the present invention, that is, the mat having a projected portion 23*a* with the shape shown in FIG. 6.

With respect to chamfers 230*a* and 230*b* of the projected portion 23*a*, the conditions such as d1/D1 and angle α were the same as those in Example 1.

Example 3

In the present example, a mat 31 was produced in the same manner as in Example 1 so as to provide the holding sealing material more specifically illustrating the third embodiment of the present invention, that is, the mat having a projected portion 33*a* with the shape shown in FIG. 7.

In this case, the width of the projected portion 33*a* on the side opposite to the member to be wrapped, which corresponded to the side 331*a*, was 108 mm, and the width of the projected portion 33*a* on the side of the member to be wrapped, which corresponded to the side 333*a*, was 100 mm.

Example 4

In the present example, a mat 41 was produced in the same manner as in Example 1 so as to be the holding sealing material more specifically illustrating the fourth embodiment of the present invention, that is, the mat having a projected portion 43*a* with the shape shown in FIG. 8.

In this case, the width of the projected portion 43*a* on the side opposite to a member to be wrapped, which corresponded to the side 431*a*, was 116 mm, and the width of the projected portion 43*a* on the side of the member to be wrapped, which corresponded to the side 433*a*, was 100 mm. Here, the projected portion 43*a* had a shape of an isosceles trapezoid in the cross-sectional view.

Example 5

In the present example, a mat 51 was produced in the same manner as in Example 1 so as to provide the holding sealing material more specifically illustrating the fifth embodiment of the present invention, that is, the mat having a recessed portion 53*b* with the shape shown in FIGS. 9A and 9B.

In this case, a chamfer 530*a* of the mat 51 in contact with a recessed portion 53*b* satisfied d2/D2=0.4 and an angle β=45°.

Example 6

In the present example, a mat 61 was produced in the same manner as in Example 1 so as to provide the holding sealing material more specifically illustrating the sixth embodiment of the present invention, that is, the mat having a recessed portion 63b with the shape shown in FIG. 10.

With respect to chamfers 630a and 630b, the conditions such as d2/D2 and angle β were the same as those in Example 5.

Example 7

In the present example, a mat 71 was produced in the same manner as in Example 1 so as to provide the holding sealing material more specifically illustrating the seventh embodiment of the present invention, that is, the mat having a projected portion 73a and a recessed portion 73b each with the shape shown in FIG. 11.

With respect to chamfers 730a and 730b in contact with the recessed portion 73b, the conditions such as d2/D2 and angle β were the same as those in Example 6. In this case, the width of the projected portion 73a on the side opposite to a member to be wrapped, which corresponded to the side 731a, was 106 mm, and the width of the projected portion 73a on the side of the member to be wrapped, which corresponded to the side 733a, was 100 mm.

Example 8

In the present example, a mat 81 was produced in the same manner as in Example 1 so as to provide the holding sealing material more specifically illustrating the eighth embodiment of the present invention, that is, the mat having a projected portion 83a and a recessed portion 83b each with the shape shown in FIG. 12 with the fitting regions of the projected and recessed portions covered with a combustible sheet.

In this case, the shapes of the projected portion 83a and the recessed portion 83b were the same as those in Example 4 shown in FIG. 8. The fitting regions of the projected portion 83a and the recessed portion 83b were covered with a polyethylene sheet having a thickness of 0.1 mm.

Example 9

In the present example, mats 91 and 92 each were produced in the same manner as in Example 1 so as to provide the holding sealing material more specifically illustrating the ninth embodiment of the present invention, that is, the mats 91 each having projected and recessed portions with the shape shown in FIG. 13.

In other words, needle-punched mats each having a thickness of 7.5 mm were produced by the same steps (1) to (7) of Example 1.

Then, the needle-punched mats each were cut in a predetermined shape. Thereby, the mats 91 and 92 (the longest and shortest mats) were produced each having the projected and recessed portions with the shape shown in FIGS. 13 and 14. The mat 91, which was the shortest mat, was produced as follows. The needle-punched mat was finish-cut to have the following shape: the length was 776 mm and the width was 290 mm in the plan view; the projected portion 93a was formed at one end with a length L11 of 40 mm, a width corresponding to the side 931a of 100 mm, and a width corresponding to the side 933a of 92 mm; and a recessed portion 93b fitting to the projected portion 93a was formed on the other end.

The other needle-punched mat was finish-cut to have the following shape: the length was 799 mm and the width was 290 mm in the plan view; the projected portion 94a was formed at one end with a length L12 of 40 mm, a width corresponding to the side 941a of 108 mm, and a width corresponding to the side 943a of 100 mm; and a recessed portion 94b fitting to the projected portion 94a was formed on the other end. Except for this finish-cutting, the mat 92 was produced in the same manner as mentioned above. The thickness of each mat was 7.5 mm.

The mats 91 and 92 thus produced were laminated so that the position bisecting the length of one mat overlapped with that of the other mat.

Then, a fixing portion was formed so as to fix the laminated mats.

Examples 10 to 16

In each of the present examples, two mats were produced in the same manner as in Example 9. Each of the two mats had a different length, and the shapes of the projected and/or recessed portions of each mat were as shown in FIG. 2A, 2B, 6, 7, 9A, 9B, 10, 11, or 12 in the cross-sectional view. The two mats were laminated so that the position bisecting the length of the mat overlapped with that of the other mat. One fixing portion for fixing the laminated mats was formed in the same manner as in Example 9.

In example 10, each of the two mats had the shape shown in FIGS. 2A and 2B. In example 11, each of the two mats had the shape shown in FIG. 6. In example 12, each of the two mats had the shape shown in FIG. 7. In example 13, each of the two mats had the shape shown in FIGS. 9A and 9B. In example 14, each of the two mats had the shape shown in FIG. 10. In example 15, each of the two mats had the shape shown in FIG. 11. In example 16, each of the two mats had the shape shown in FIG. 12.

The following will describe comparative examples in order to compare with Examples 1 to 16.

Comparative Example 1

Figure 15:
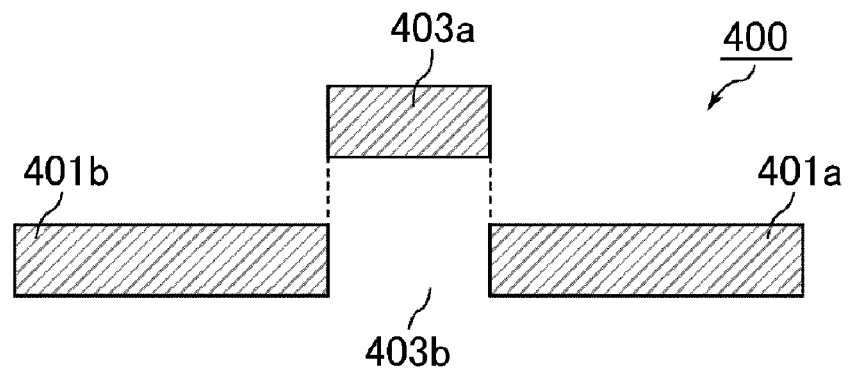
FIG. 15 is a cross-sectional view perpendicular to the longitudinal direction schematically showing a holding sealing material of a comparative example when the holding sealing material is rolled around the periphery of a member to be wrapped and immediately before projected and recessed portions fit to each other.

FIG. 15 is a cross-sectional view perpendicular to the longitudinal direction schematically showing the holding sealing material of the present comparative example when the holding sealing material is rolled around the periphery of a member to be wrapped and immediately before the projected and recessed portions fit to each other.

In the holding sealing material of the present comparative example, the projected portion 403a did not have a chamfer, and each of the mats 401a and 401b adjacent to the recessed portion also did not have a chamfer, different from the mat 11 of Example 1. The mat 401 was formed so as to have such a shape.

Specifically, the mat 401 was produced in the same manner as in Example 1 except that a corner of the projected portion 403a was not cut in order not to form a chamfer at the end stage of the procedure.

Comparative Example 2

Two mats each having a different length and both having the same shape in Comparative Example 1 were produced in the same manner as in Example 9. The two mats were laminated such that the portion bisecting the length of one mat overlapped with that of the other mat. One fixing portion for fixing the laminated mats was formed.

Each of the holding sealing materials produced in Examples 1 to 16 and Comparative Examples 1 and 2 was subjected to a rolling test 50 times. In the rolling test, the holding sealing material was rolled around a catalyst supporting carrier having a diameter of 9.5 inch. The ends of the mat where the projected and recessed portions fitted to each other were observed, and presence of overlapping of the fitting portions was checked. If overlapping was observed at the projected and recessed portions, even though slightly, the holding sealing material was evaluated as failure in rolling. Table 1 shows the results.

TABLE 1

| | The number of mats | The number of failures in rolling (/50) | | The number of mats | The number of failures in rolling (/50) |
|---|---|---|---|---|---|
| Example 1 | 1 | 0/50 | Example 10 | 2 | 0/50 |
| Example 2 | 1 | 0/50 | Example 11 | 2 | 0/50 |
| Example 3 | 1 | 0/50 | Example 12 | 2 | 0/50 |
| Example 4 | 1 | 0/50 | Example 9 | 2 | 0/50 |
| Example 5 | 1 | 0/50 | Example 13 | 2 | 0/50 |
| Example 6 | 1 | 0/50 | Example 14 | 2 | 0/50 |
| Example 7 | 1 | 0/50 | Example 15 | 2 | 0/50 |
| Example 8 | 1 | 0/50 | Example 16 | 2 | 0/50 |
| Comparative Example 1 | 1 | 4/50 | Comparative Example 2 | 2 | 22/50 |

With respect to the holding sealing materials of Examples 1 to 16, the projected portion smoothly fitted to the recessed portion and overlapping of the fitting portions of the mat was prevented in all of the 50 rolling tests.

With respect to the holding sealing material of Comparative Example 1, slight overlapping of the fitting portions of the mat was observed in 4 of the 50 rolling tests. With respect to the holding sealing material of Comparative Example 2, overlapping of the fitting portions of the mat was observed in 22 rolling tests, about half the number of the performed rolling tests.

Tenth Embodiment

In the first to ninth embodiments of the present invention, the side of the recessed portion of the mat is first brought close to the member to be wrapped and then the projected portion is allowed to fit to the recessed portion when the holding sealing material is rolled around a member to be wrapped. Alternatively, the side of the projected portion of the mat may be first brought close to the member to be wrapped and then the recessed portion may be allowed to fit to the projected portion when the holding sealing material is rolled around the periphery of a member to be wrapped, as mentioned in the present embodiment.

In the present embodiment, the projected portion tends to be allowed to smoothly fit to the recessed portion owing to a chamfer 1030a formed on the projected portion 103a at the opposite side in the case of the first to ninth embodiments of the present invention (the side opposite to a member to be wrapped).

Figure 16A:
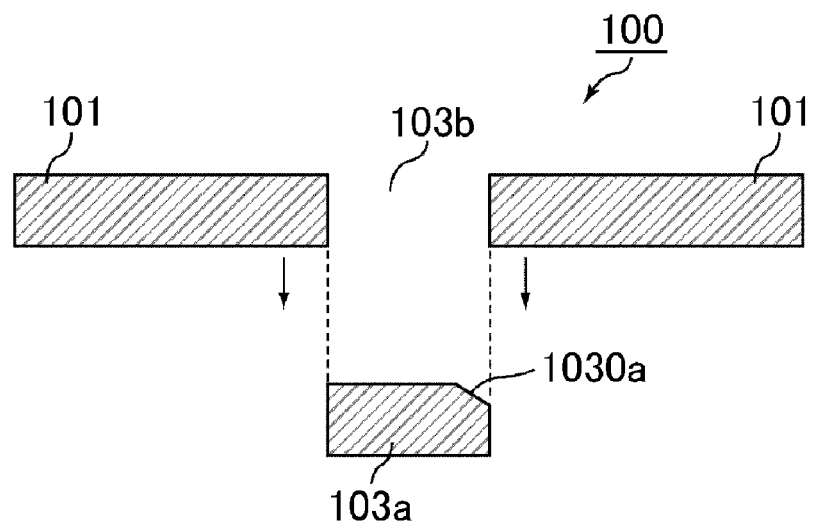
FIGS. 16A and 16B each are a cross-sectional view perpendicular to the longitudinal direction schematically showing a holding sealing material of a tenth embodiment of the present invention when the holding sealing material is rolled around the periphery of a member to be wrapped and immediately before projected and recessed portions fit to each other.
Figure 16B:
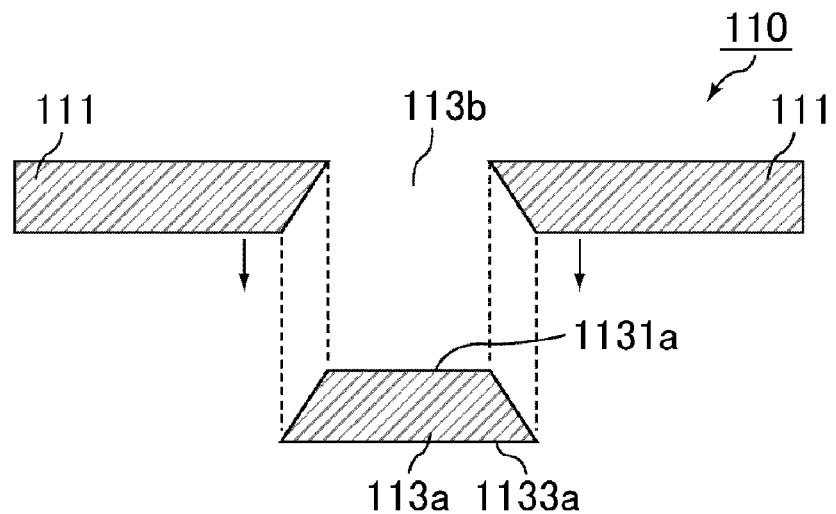

FIGS. 16A and 16B show two specific examples of the present embodiment. FIGS. 16A and 16B each are a cross-sectional view perpendicular to the longitudinal direction schematically showing the holding sealing material of the tenth embodiment of the present invention when the holding sealing material is rolled around the periphery of a member to be wrapped and immediately before the projected and recessed portions fit to each other.

As shown in FIG. 16A, the projected portion 103a of the mat 101 in the holding sealing material 100 has a shape of a quadrangle in the cross-sectional view perpendicular to the longitudinal direction, and a corner portion on the side opposite to the member to be wrapped is cut and thereby a chamfer 1030a is formed.

As shown in FIG. 16B, the projected portion 113a of the mat 111 in the holding sealing material 110 has a trapezoidal shape in which the side 1131a (upper base) furthest from the member to be wrapped is shorter than the side 1133a (lower base) in the cross-sectional view perpendicular to the longitudinal direction.

In the holding sealing material shown in FIG. 16A, the recessed portion tends to smoothly fit to the projected portion and overlapping of the fitting portions of the mat tends to be prevented when the side of the projected portion 103a of the mat 101 in the holding sealing material 100 is first brought close to the member to be wrapped and then the recessed portion 103b is allowed to fit to the projected portion 103a even though slight displacement of the mat occurs in the width direction because the chamfer 1030a is formed on the projected portion 103a. Thus, the holding sealing material tends to prevent leakage of exhaust gas when it is rolled around the periphery of the exhaust gas treating unit.

In the holding sealing material shown in FIG. 16B, the recessed portion tends to smoothly fit to the projected portion and overlapping of the fitting portions of the mats tends to be prevented when the side of the projected portion 113a of the mat 111 in the holding sealing material 110 is first brought close to the member to be wrapped and then the recessed portion 113b is allowed to fit to the projected portion 113a even though slight displacement of the mat occurs in the width direction because the side 1131a opposite to the member to be wrapped is the upper base and has a narrower width in the projected portion. Thus, the holding sealing material prevents leakage of exhaust gas when it is rolled around the periphery of the exhaust gas treating unit.

The present embodiment shows the holding sealing materials 100 and 110 shown in FIGS. 16A and 16B, respectively, in each of which the position of the chamfer and an incline are upside down (the positional relationship to a member to be wrapped is opposite, for example, the chamfer is close to or far from the member to be wrapped) in comparison with the holding sealing materials 10 and 40 shown in FIGS. 2B and 8, respectively, in the figure. The shape of the holding sealing material is not limited to these shapes. In other words, the holding sealing material may be any one shown in FIGS. 6, 7, 9A, 9B, 10, 11, and 12 in the upside-down state (the positional relationship to a member to be wrapped is opposite, for example, the chamfer is close to or far from the member to be wrapped) as shown in FIGS. 16A and 16B.

Other Embodiments

In the holding sealing material mentioned in the ninth embodiment of the present invention shown in FIG. 13, two or more mats laminated are fixed to each other by a single fixing portion. The number of the fixing portion is not limited to one, and multiple fixing portions may be formed.

In the case of the multiple fixing portions, each of these fixing portions is preferably disposed at a different position in the longitudinal direction in the side view with the fixing portions projected thereon.

In addition, each of the fixing portions is preferably separated from the long side faces of the mat by a predetermined distance and continuously extends in the width direction so as to occupy 50% to 99.5% of the width of the mat.

In the holding sealing material according to the embodiments of the present invention, the method for fixing the mats is not limited to machine-sewing. Examples thereof include needling and fixing with adhesive, staples, pins, and tapes.

Any fixing method may be employed as long as it fixes the mats to each other. Preferable among these fixing methods is machine-sewing. This is because the machine-sewing tends to enable secure fixing of the mats and the specifications of the fixing are easily changed if necessary.

With respect to the projected and recessed portions formed on the short sides of the holding sealing material according to the embodiments of the present invention, the projected portion having a size of 10 to 300 mm in width×10 to 100 mm in length is preferably formed on part of one short side and the recessed portion which is to fit to the projected portion is preferably formed on part of the other short side. In the case that the holding sealing material having such projected and recessed portions are used in the production of the exhaust gas purifying apparatus, the holding sealing material tends to securely hold the exhaust gas treating unit. Thus, the handleability is excellent.

The average fiber length of the inorganic fibrous material is preferably 30 µm to 120 mm, and more preferably 50 µm to 100 mm in the holding sealing material according to the embodiments of the present invention.

The average fiber diameter of the inorganic fibrous material is preferably 2 to 12 µm, and more preferably 3 to 10 µm in the holding sealing material according to the embodiments of the present invention.

The amount of the binder in the holding sealing material according to the embodiments of the present invention is preferably 0.2 to 20% by weight, more preferably 0.5 to 15% by weight, and further preferably 1 to 12% by weight. The organic binder in an amount of 0.2% by weight or more tends not to cause a low balk density of the holding sealing material. Thus, stuffing of the holding sealing material into the casing tends not to be difficult. In addition, the inorganic fibrous material of the holding sealing material tends to be sufficiently bonded. Thus, the inorganic fibrous material is less likely to be scattered. The binder in an amount of 20% by weight or less tends not to cause an increase in the amount of the organic component in exhaust gas in the case that the holding sealing material is used for the exhaust gas purifying apparatus. Thus, a load tends not to be applied on the environment.

The amount per unit area of the holding sealing material according to the embodiments of the present invention is not particularly limited; it is preferably 200 to 2000 g/m$^2$, and more preferably 300 to 1900 g/m$^2$. The bulk density is also not particularly limited; it is preferably 0.10 to 0.30 g/m$^3$.

The organic binder for the production of the holding sealing material according to the embodiments of the present invention is not limited to the acrylic resin used in Example 1. Examples thereof include rubbers such as acryl rubber; water-soluble organic polymers such as carboxymethyl cellulose and polyvinyl alcohol; thermoplastic resins such as styrene resin; and thermosetting resins such as epoxy resin. In particular, acryl rubber, acrylonitrile-butadiene rubber, and styrene-butadiene rubber are preferable.

The inorganic binder for the production of the holding sealing material according to the embodiments of the present invention is not limited to alumina sol, and may be silica sol, for example.

The emulsion for the production of the holding sealing material according to the embodiments of the present invention may contain two or more kinds of the aforementioned organic binders.

The emulsion may be latex in which the organic binder is dispersed in water, or may be a solution in which the organic binder is dissolved in water or an organic solvent.

In the case that the holding sealing material according to the embodiments of the present invention includes multiple mats, each of the mats may have substantially the same thickness, or may have a different thickness. The thickness of each mat may be appropriately selected depending on properties for the holding sealing material such as flexibility and a holding power.

The material of the casing for the exhaust gas purifying apparatus according to the embodiments of the present invention is not particularly limited as long as it is a heat-resistant metal. Specific examples thereof include metals such as stainless steel and iron.

In the case that a cylindrical casing is used in the exhaust gas purifying apparatus, the exhaust gas purifying apparatus tends to be produced as follows: the holding sealing material is rolled around the exhaust gas treating unit; the wrapped exhaust gas treating unit is put inside a casing having an inner diameter larger than the sum of the diameter of the end face of the exhaust gas treating unit and the thickness of the holding sealing material rolled around the exhaust gas treating unit; and the casing is compressed from the peripheral side by a pressing apparatus, that is, by a sizing technique.

The exhaust gas treating unit for the exhaust gas purifying apparatus according to the embodiments of the present invention may be an integral exhaust gas treating unit in which the whole unit is formed by a single sintered body as shown in FIG. 6A, or may be an aggregated exhaust gas treating unit in which honeycomb fired bodies each having cells disposed in parallel in the longitudinal direction with cell walls interposed therebetween are bound together via adhesive layers.

The exhaust gas treating unit for the exhaust gas purifying apparatus according to the embodiments of the present invention may support a catalyst. Examples of the catalyst include noble metals such as platinum, palladium, and rhodium; alkaline metals such as potassium and sodium; alkaline earth metals such as barium; and metal oxides. Each of these catalysts may be used alone, or two or more of these may be used in combination.

Obviously, numerous modifications and variations of the present invention are possible in light of the above teachings. It is therefore to be understood that within the scope of the appended claims, the invention may be practiced otherwise than as specifically described herein.

What is claimed a new and desired to be secured by Letter Patent of the United States is:

1. A holding sealing material comprising
a mat including an inorganic fibrous material,
in a plan view, the mat having a basic quadrangular shape consisting of long sides extending in a longitudinal direction and short sides substantially perpendicular to the long sides,
the mat having a recessed portion at one of the short sides and having a projected portion at another of the short sides, whereby the projected and recessed portions should fit to each other when the mat is rolled around a periphery of a member to be wrapped, the mat having a first surface configured to be closest to the member when the mat is wrapped around the member, and a second surface opposite to the first surface, and
the holding sealing material satisfying any one of following features (A) to (D):
(A) in a cross-sectional view perpendicular to the longitudinal direction, the projected portion having a shape of a quadrangle and the quadrangle being cut at least one corner portion on a side of the first surface to form an inclined surface that is inclined with respect to the first and second surfaces;

(B) in the cross-sectional view, the recessed portion being a gap between two quadrangles and at least one of the quadrangles being cut at a corner portion closer to the gap on a side of the second surface to form an inclined surface that is inclined with respect to the first and second surfaces;

(C) in the cross-sectional view, the projected portion having a shape of a quadrangle and the quadrangle being cut at least one corner portion on a side of the second surface to form an inclined surface that is inclined with respect to the first and second surfaces; and (D) in the cross-sectional view, the recessed portion being a gap between two quadrangles and at least one of the quadrangles being cut at a corner portion closer to the gap on a side of the first surface to form an inclined surface that is inclined with respect to the first and second surfaces.

2. The holding sealing material according to claim 1, wherein
the holding sealing material satisfies the feature (A), and
in the cross-sectional view, the quadrangle of the projected portion is cut at two corner portions on the side of the first surface.

3. The holding sealing material according to claim 1, wherein
the holding sealing material satisfies the feature (A), and further satisfies $d1/D1=0.1$ to $0.6$ wherein, assuming that one of the long sides substantially parallel to a surface of the member to be wrapped is Long side A and the short side substantially perpendicular to Long side A is Short side B in an uncut quadrangle, d1 represents a distance between an intersection point of a cut line with Short side B and an end point of Short side B closer to the member to be wrapped, and D1 represents a length of Short side B.

4. The holding sealing material according to claim 1, wherein
the holding sealing material satisfies the feature (A),
the corner portion on the side of the first surface is linearly cut, and
an extension line of a side closest to the member to be wrapped forms an angle α of 25° to 80° with a cut line.

5. The holding sealing material according to claim 1, wherein
the holding sealing material satisfies the feature (A) or (B), and
in the cross-sectional view perpendicular to the longitudinal direction, the projected portion is a trapezoid in which a side closest to the member to be wrapped is shorter than an opposite side, and the recessed portion has a shape such that the projected and recessed portions fit to each other.

6. The holding sealing material according to claim 1, wherein
the holding sealing material satisfies the feature (B), and
in the cross-sectional view, the two quadrangles adjacent to the recessed portion each are cut at a corner portion closer to the gap on the side of the second surface.

7. The holding sealing material according to claim 1, wherein
the holding sealing material satisfies the feature (B), and further satisfies $d2/D2=0.1$ to $0.6$ wherein, assuming that one of the long sides substantially parallel to a surface of the member to be wrapped is Long side E and the short side substantially perpendicular to Long side A is Short side F in an uncut quadrangle, d2 represents a distance between an intersection point of an cut line with Short side F and an end point of Short side F further from the member to be wrapped, and D2 represents a length of Short side F.

8. The holding sealing material according to claim 1, wherein
the holding sealing material satisfies the feature (B),
the corner portion closer to the gap on the side of the second surface is linearly cut, and
an extension line of a side opposite to the member to be wrapped forms an angle β of 25° to 80° with a cut line.

9. A holding sealing material comprising
a laminate of mats, each of said mats comprising the mat defined in claim 1,
one of the mats disposed closest to the member to be wrapped being shortest in the longitudinal direction, and
other mats being disposed in increasing order of length.

10. The holding sealing material according to claim 9, wherein
in the cross-sectional view perpendicular to the longitudinal direction of the laminate of the mats, the projected portions of the mats integrally form a trapezoidal shape and the recessed portions of the mats integrally form a shape such that the projected and recessed portions fit to each other when the laminate of the mats is rolled around the periphery of the member to be wrapped.

11. The holding sealing material according to claim 9, wherein
the mats are fixed to each other by at least one fixing portion.

12. The holding sealing material according to claim 11, wherein
the fixing portion is or the fixing portions are separated from at least one of long side faces of the mat.

13. The holding sealing material according to claim 9, wherein
the mats are fixed to each other by at least two fixing portions, and
in a side view, the at least two fixing portions are disposed at different positions in the longitudinal direction.

14. The holding sealing material according to claim 13, wherein
the fixing portions each extend in a width direction perpendicular to the longitudinal direction of the mats.

15. The holding sealing material according to claim 1, wherein
at least a fitting region of the projected portion of the mat is covered with a combustible film.

16. The holding sealing material according to claim 15, wherein
a whole of the mat or a whole of a laminate of the mats is covered with a combustible film.

17. The holding sealing material according to claim 1, wherein
the mat includes a bonding material.

18. The holding sealing material according to claim 1, wherein
the mat is a needle-punched mat.

19. The holding sealing material according to claim 1, wherein
the inorganic fibrous material includes a mixture of alumina and silica.

20. The holding sealing material according to claim 1, wherein
the member to be wrapped is a catalyst supporting carrier or an exhaust gas filter.

21. A method for rolling the holding sealing material according to claim 1 around the periphery of a member to be wrapped, comprising
bringing the side having the recessed portion close to the periphery of the member;
rolling the holding sealing material around the periphery of the member to be wrapped; and
fitting the projected portion to the recessed portion.

22. An exhaust gas purifying apparatus comprising
a pillar-shaped exhaust gas treating unit;
a casing; and
the holding sealing material according to claim 1,
the exhaust gas treating unit including cells disposed in parallel in a longitudinal direction of the unit with cell walls interposed therebetween,
the casing accommodating the exhaust gas treating unit,
the holding sealing material disposed between the exhaust gas treating unit and the casing, and holding the exhaust gas treating unit, and
the exhaust gas treating unit serving as a member to be wrapped by the holding sealing material including the mat.

23. The exhaust gas purifying apparatus according to claim 22, wherein
the exhaust gas treating unit is a catalyst supporting carrier or an exhaust gas filter.

* * * * *